United States Patent
Tsuru et al.

(10) Patent No.: US 8,955,887 B2
(45) Date of Patent: Feb. 17, 2015

(54) LIQUID PHASE DIFFUSION BONDED PIPE JOINT

(75) Inventors: Eiji Tsuru, Tokyo (JP); Yasushi Hasegawa, Tokyo (JP); Yasuhiro Shinohara, Tokyo (JP); Yuichi Sato, Tokyo (JP)

(73) Assignee: Nippon Steel & Sumitomo Metal Corporation, Tokyo (JP)

( * ) Notice: Subject to any disclaimer, the term of this patent is extended or adjusted under 35 U.S.C. 154(b) by 310 days.

(21) Appl. No.: 12/737,847

(22) PCT Filed: Aug. 19, 2009

(86) PCT No.: PCT/JP2009/064812
§ 371 (c)(1),
(2), (4) Date: Feb. 17, 2011

(87) PCT Pub. No.: WO2010/024261
PCT Pub. Date: Mar. 4, 2010

(65) Prior Publication Data
US 2011/0148102 A1    Jun. 23, 2011

(30) Foreign Application Priority Data

Aug. 27, 2008 (JP) .................................. 2008-217934
May 29, 2009 (JP) .................................. 2009-130094

(51) Int. Cl.
*F16L 13/14* (2006.01)
*F16L 13/00* (2006.01)
(Continued)

(52) U.S. Cl.
CPC ............. *B23K 20/023* (2013.01); *B23K 20/002* (2013.01); *B23K 33/006* (2013.01); *F16L 13/0227* (2013.01); *B23K 2201/06* (2013.01)

USPC ................ 285/289.5; 285/288.11; 285/289.1; 285/334.5; 228/173.4; 228/194; 228/249

(58) Field of Classification Search
USPC ........ 285/288.11, 289.1, 289.2, 289.3, 289.4, 285/289.5, 334.2, 334.5, 288.1
See application file for complete search history.

(56) References Cited

U.S. PATENT DOCUMENTS 102,443 A * 4/1870 Smith ....................... 285/133.11
956,294 A * 4/1910 Corcoran ................. 285/148.11
(Continued)

FOREIGN PATENT DOCUMENTS

| | | |
|---|---|---|
| JP | 9-85467 | 3/1997 |
| JP | 9-182979 | 7/1997 |

(Continued)

OTHER PUBLICATIONS

International Search Report dated Nov. 17, 2009 issued in corresponding PCT Application No. PCT/JP2009/064812.

*Primary Examiner* — James Hewitt
(74) *Attorney, Agent, or Firm* — Kenyon & Kenyon LLP

(57) ABSTRACT

A liquid phase diffusion bonded pipe joint comprised of metal pipes or a metal pipe and a joint pipe joined by liquid phase diffusion bonding, the liquid phase diffusion bonded pipe joint comprised of a metal joint provided with a tapered slanted part press-fit into an end of a metal pipe by a thrust in a pipe axial direction while expanding the metal pipe in inside diameter and tightly engaging with the end and a joining surface part continuing from the tapered slanted part and joined with an end face of the metal pipe by liquid phase diffusion bonding and a metal pipe tightly engaging with the tapered slanted part in the expanded state and with an end face joined with the joining surface part by liquid phase diffusion bonding.

9 Claims, 12 Drawing Sheets

(51) Int. Cl.
    *B23K 20/02*     (2006.01)
    *B23K 20/00*     (2006.01)
    *B23K 33/00*     (2006.01)
    *F16L 13/02*     (2006.01)

(56) References Cited

U.S. PATENT DOCUMENTS

| | | | | |
|---|---|---|---|---|
| 1,339,739 | A | * | 5/1920 | Coleman .................... 285/381.1 |
| 1,762,766 | A | * | 6/1930 | De Garay ....................... 285/331 |
| 1,886,275 | A | * | 11/1932 | Nell ............................ 285/288.6 |
| 1,934,022 | A | * | 11/1933 | Wiggins ..................... 285/289.3 |
| 1,941,115 | A | * | 12/1933 | Strenger .................... 285/288.2 |
| 1,981,850 | A | * | 11/1934 | Fisher ........................ 228/173.2 |
| 2,003,488 | A | * | 6/1935 | Hook .......................... 285/289.1 |
| 2,125,324 | A | * | 8/1938 | Williams et al. ................. 285/22 |
| 2,646,995 | A | * | 7/1953 | Thompson ............... 285/288.11 |
| 3,032,870 | A | * | 5/1962 | Rohrberg et al. ............. 228/154 |
| 3,437,358 | A | * | 4/1969 | Cepon ........................ 285/288.1 |
| 4,307,833 | A | * | 12/1981 | Barnard ...................... 228/136 |
| 4,883,292 | A | * | 11/1989 | Kuroki ............................ 285/55 |
| 5,549,335 | A | | 8/1996 | Wohrstein |
| 5,875,954 | A | * | 3/1999 | Kishi et al. .................... 228/194 |
| 6,156,134 | A | * | 12/2000 | Shimizu et al. ............... 148/526 |
| 8,002,167 | B2 | * | 8/2011 | Zuber et al. .................... 228/135 |
| 2002/0014514 | A1 | * | 2/2002 | Shimizu et al. ............... 228/104 |
| 2005/0104368 | A1 | * | 5/2005 | Twigg .......................... 285/21.1 |
| 2006/0163321 | A1 | * | 7/2006 | Hasegawa et al. ............ 228/101 |

FOREIGN PATENT DOCUMENTS

| | | |
|---|---|---|
| JP | 10-58162 | 3/1998 |
| JP | 10-85954 | 4/1998 |
| JP | 2001-330594 | 11/2001 |
| JP | 2001-340974 | 12/2001 |

* cited by examiner

US 8,955,887 B2

LIQUID PHASE DIFFUSION BONDED PIPE JOINT

This application is a national stage application of International Application No. PCT/JP2009/064812, filed 19 Aug. 2009, which claims priority to Japanese Application Nos. 2008-217934, filed 27 Aug. 2008; and 2009-130094, filed 29 May 2009, each of which is incorporated by reference in its entirety.

TECHNICAL FIELD

The present invention relates to a liquid phase diffusion bonded pipe joint comprised of metal pipes or a metal pipe and joint pipe joined by liquid phase diffusion bonding and a method of production of the same. When joining one end of a joint pipe to a metal pipe by liquid phase diffusion bonding, the other end of the joint pipe can be joined to a member other than a metal pipe, for example, a wall etc.

BACKGROUND ART

Liquid phase diffusion bonding is a joining technique interposing an insert material having a melting point lower than the joined members, for example, an amorphous metal or amorphous alloy, at the joining surfaces, heating to a temperature higher than a liquidus temperature of the insert material and a temperature lower than the melting point of the joined members, causing the joined parts to melt, and causing isothermal solidification. The amorphous metal, amorphous alloy, or other insert material may, for example, be used in a foil, powder, plating, or other form.

This liquid phase diffusion bonding is applied to joining of stainless steel, high nickel-based alloys, heat resistant steel alloy steels, and other steels difficult to weld by conventional welding methods. Furthermore, according to liquid phase diffusion bonding, it is possible to simultaneously join a large number of locations. Further, when joining members with large cross-sectional areas of the joined parts, the required time does not greatly increase. For this reason, for the purpose of reducing installation costs, liquid phase diffusion bonding is now also being applied even to steel materials able to be joined by welding.

When applying liquid phase diffusion bonding to joining metal pipes, the general practice has been to interpose an insert material constituted by an amorphous metal or amorphous alloy foil between the end faces of the facing metal pipes, apply an axial compressive force to the metal pipes, and while doing so heat the joining surfaces and their vicinities to the liquidus temperature or more.

However, at the time of actual operation, in particular with joining at installation sites, the applied surface pressure becomes unstable. Further, depending on the location of the joining surfaces, the surface pressure becomes low and sufficient joining strength cannot be obtained in some cases.

Furthermore, if the metal pipes are shaped elliptically or are uneven in thickness, the actual joining surfaces will sometimes be reduced from the cross-sectional areas of the joined pipes and the joining strength will deteriorate.

To solve these problems, a joint has been proposed improved in strength by greatly increasing the joining surface with a tapered metal pipe through a coupling or nipple (see for example, PLT 1). Further, a joint has been proposed tapering metal pipes and bonding the metal pipes by liquid phase diffusion bonding (see for example, PLTs 2 and 3).

CITATION LIST

Patent Literature

PLT 1: Japanese Patent Publication (A) No. 10-85954
PLT 2: Japanese Patent Publication (A) No. 2001-340974
PLT 3: Japanese Patent Publication (A) No. 2001-330594

SUMMARY OF INVENTION

Technical Problem

However, in conventional joints, there is the problem that if not precisely machining the metal pipes, couplings, and nipples, the joining strength deteriorates. The present invention has as its object the improvement of the joining strength of a liquid phase diffusion bonded pipe joint comprised of a metal pipe or metal joint of a metal member and a joint pipe or thick-walled metal pipe tapered at the outside surface at one end or both ends joined together by liquid phase diffusion bonding.

Solution to Problem

The present invention fits a metal pipe over a metal member, joint pipe, or thick-walled metal pipe provided with a front tapered part and step part while expanding it so that a cross-sectional area of an end face of the metal pipe becomes larger than the cross-sectional area of the pipe body, makes the step part and end of the metal pipe abut while interposing an insert material, and heats this for liquid phase diffusion bonding and thereby succeeded in improving the joining strength of a liquid phase diffusion bonded pipe joint.

The present invention can adopt the modes shown below.

(1) A liquid phase diffusion bonded pipe joint comprised of a metal joint provided with a tapered slanted part press-fit into an end of a metal pipe by a thrust in a pipe axial direction while expanding the metal pipe in inside diameter and tightly engaging with the end and a joining surface part continuing from the tapered slanted part and joined with an end face of the metal pipe by liquid phase diffusion bonding and a metal pipe tightly engaging with the tapered slanted part in the expanded state and with an end face joined with the joining surface part by liquid phase diffusion bonding.

(2) A liquid phase diffusion bonded pipe joint as set forth in (1), wherein a thickness of the end of the metal pipe tightly engaged with the tapered slanted part in the expanded state is at least a thickness of a metal pipe body.

(3) A liquid phase diffusion bonded pipe joint as set forth in (1) or (2), wherein the metal joint is formed at a metal structure.

(4) A liquid phase diffusion bonded pipe joint as set forth in (3), wherein the metal structure is provided with a pipeline inside it and the metal joint is provided with a pipeline connecting the pipeline and metal pipe.

(5) A liquid phase diffusion bonded pipe joint as set forth in (1) or (2), wherein the metal joint is formed at an end of another metal pipe to be joined with the metal pipe.

(6) A liquid phase diffusion bonded pipe joint as set forth in (1) or (2), wherein the metal joint is a metal joint pipe provided with a joining surface part at its center and provided with tapered slanted parts continuing from the joining surface part at its two sides.

(7) A liquid phase diffusion bonded pipe joint as set forth in (7), wherein when a slant angle of one tapered slanted part of the metal joint pipe is $S_1$, a slant angle of the other tapered slanted part is $S_2$/a cross-sectional area of a metal pipe with an end tightly engaged with the tapered slanted part of the slant angle $S_1$ and with an end face joined to one surface of the center joining surface part by liquid phase diffusion bonding is $A_1$, and a cross-sectional area of a metal pipe with an end tightly engaged with the tapered slanted part of the slant angle $S_2$ and with an end face joined to the other surface of the center joining surface part by liquid phase diffusion bonding is $A_2$/$S_1$, $S_2$, $A_1$, and $A_2$ satisfy the following formula (1):

$$0.8 \leq (S_1 \times A_1)/(S_2 \times A_2) \leq 1.2 \qquad (1)$$

(8) A liquid phase diffusion bonded pipe joint as set forth in (7), wherein a thickness of the metal pipe of the cross-sectional area $A_1$ and a thickness of the metal pipe of the cross-sectional area $A_2$ are different.

(9) A liquid phase diffusion-bonded pipe joint as set forth in any one of (1) to (8), wherein an angle formed by the tapered slanted part and joining surface part is 70 to 110°.

(10) A method of production of a liquid phase diffusion bonded pipe joint as set forth in any one of (1) to (9), which method of production of a liquid phase diffusion bonded pipe joint, comprises (i) press-fitting a tapered slanted part of a metal joint, provided with a tapered slanted part to be press-fit into an end of a metal pipe while expanding the metal pipe in inside diameter and tightly engaging with the end and a joining surface part continuing from the tapered slanted part and joined with an end face of the metal pipe by liquid phase diffusion bonding, by a thrust in the pipe axial direction so as to press-fit it into the end of the metal pipe while expanding the metal pipe in inside diameter and making the end face of the expanded metal pipe and the joining surface part of the metal joint abut through an insert material and (ii) using the thrust in the pipe axial direction to maintain a surface pressure at an abutting part including the insert material while heating the abutting part to a temperature where the insert material melts and joining the end face of the metal pipe and the joining surface part by liquid phase diffusion bonding.

(11) A method of production of a liquid phase diffusion bonded pipe joint as set forth in (10), wherein the metal pipe is a metal pipe of an inside diameter larger than a minimum outside diameter and smaller than a maximum outside diameter of the tapered slanted part.

(12) A method of production of a liquid phase diffusion bonded pipe joint as set forth in (10) or (11), further comprising using, as the metal joint, a metal joint pipe provided with a joining surface part at its center and provided with tapered slanted parts continuing from the joining surface part at its two sides and joining metal pipes to the two sides of the metal joint pipe by liquid phase diffusion bonding in which case, when a slant angle of one tapered slanted part of the metal joint pipe is $S_1$, a slant angle of the other tapered slanted part is $S_2$, a cross-sectional area of a metal pipe with an end tightly engaged with the tapered slanted part of the slant angle $S_1$ and with an end face joined to one surface of the center joining surface part by liquid phase diffusion bonding is $A_1$, and a cross-sectional area of a metal pipe with an end tightly engaged with the tapered slanted part of the slant angle $S_2$ and with an end face joined to the other surface of the center joining surface part by liquid phase diffusion bonding is $A_2$, $S_1$, $S_2$, $A_1$, and $A_2$ satisfy the following formula (1):

$$0.8 \leq (S_1 \times A_1)/(S_2 \times A_2) \leq 1.2 \qquad (1)$$

(13) A method of production of a liquid phase diffusion bonded pipe joint as set forth in (12), wherein a thickness of the metal pipe of the cross-sectional area $A_1$ and a thickness of the metal pipe of the cross-sectional area $A_2$ are different.

(14) A method of production of a liquid phase diffusion bonded pipe joint as set forth in any one of (10) to (13), wherein the surface pressure is 5 to 20 MPa.

Note that, in the present invention, a "metal joint" shall indicate a part or member for joining a metal pipe and is not limited to a part or member for connecting two metal pipes. Further, a "metal joint pipe" shall indicate, among metal joints, a part or member for connecting two metal pipes. Further, a "liquid phase diffusion bonded pipe joint" shall indicate a part or member joining the metal joint or metal joint pipe and at least one metal pipe by liquid phase diffusion bonding.

Advantageous Effects of Invention

According to the present invention, by controlling the surface pressure at the time of heating, it is possible to avoid fracture at the joining surfaces. Also, without causing a large rise in the joining costs, it is possible to provide a liquid phase diffusion bonded pipe joint joining a metal material and a metal member, joint pipe, or thick-walled metal pipe tapered at the outside surface at one end or both ends by liquid phase diffusion bonding and thereby excellent in joining strength. Furthermore, according to the present invention, it is possible to provide a liquid phase diffusion bonded pipe joint connecting metal pipes of different wall thicknesses, a liquid phase diffusion bonded pipe joint connecting metal pipes of different outside diameters, etc.

DESCRIPTION OF EMBODIMENTS

Below, embodiments of the present invention will be explained with reference to the drawings. Note that, in the Description and Drawings, components having substantially the same functions will be assigned the same notations and explanations will be omitted.

Figure 1:
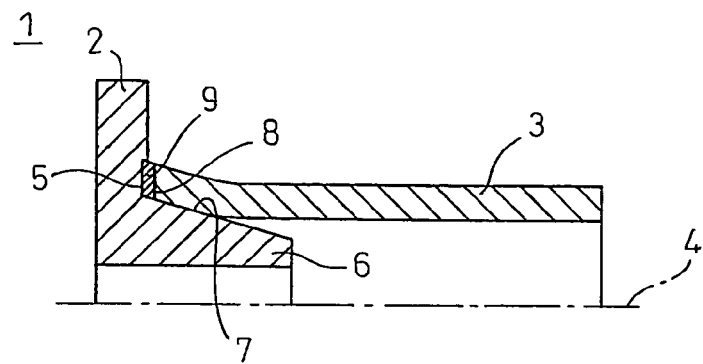
FIG. 1 is a view showing an example of a liquid phase diffusion bonded pipe joint according to a first embodiment of the present invention.

FIG. 1 shows an example of a liquid phase diffusion bonded pipe joint according to a first embodiment of the present invention, that is, a liquid phase diffusion bonded pipe joint 1 comprised of a metal joint 2 over which a metal pipe 3 is inserted. The metal joint 2 and metal pipe 3 are rotationally symmetric bodies having the axis of rotational symmetry 4 as their axes (below, same in drawings in which axis of rotational symmetry 4 is drawn).

The metal joint 2 has a ring-shaped joining surface part 5 against the outside surface of which the end face 8 of the metal pipe 3 abuts and a tapered slanted part 6 extending from the joining surface part 5 in the end face direction while being reduced in diameter. A liquid phase diffusion bonded part in the liquid phase diffusion bonded pipe joint 1 shown in FIG. 1 (below, also called the "joined part") is a part between the joining surface part 5 and the end face 8 of the metal pipe 3.

Further, in the liquid phase diffusion bonded pipe joint 1, the vicinity of the joined part is supported by the outside surface 7 of the tapered slanted part 6 (below, the "slanting surface") from the inside surface. For this reason, when tensile stress is applied in the vicinity of the joined part, deformation causing reduction of the diameter in the inside diameter direction is constrained by the supporting force from the inside surface. As a result, in the vicinity of the joined part of the liquid phase diffusion bonded pipe joint 1, tensile stress occurs in the axial direction and circumferential direction and yielding becomes difficult compared with the single-axis stress state.

On the other hand, when there is no tapered slanted part 6 at the outside surface of the metal joint 2, stress close to mono-axial stress similar to the pipe body acts at the joined part of the joining surface part 5 and the end face 8 of the metal pipe 3. In this case, in the vicinity of the joining surface, shape irregularities in the state as joined remains, so the joint easily fractures at the tensile strength of the pipe body or less.

Furthermore, in the liquid phase diffusion bonded pipe joint 1, the thickness of the end of the metal pipe 3 is preferably at least the thickness of the body of the metal pipe 3 for improving the joining strength. That is, the thickness of the pipe end of the metal pipe 3 press-fit over the tapered slanted part 6 is preferably larger than the average value of the thickness of the body of the metal pipe 3 (not expanded part).

This is because, by imparting a thrust in the heated state, the end of the metal pipe 3 is increased in thickness and, as a result, the joined area of the end face 8 of the metal pipe 3 and the joining surface part 5 increases and the joining strength increases. Due to the above such constraining effect and wall thickening effect, the liquid phase diffusion bonded pipe joint 1 is provided with a joining strength of the strength of the body of the metal pipe 3 or more even in the state as joined.

Figure 2:
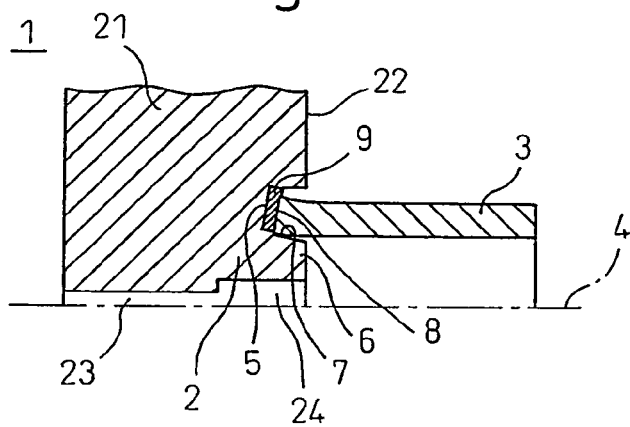
FIG. 2 is a view showing an example of a liquid phase diffusion bonded pipe joint according to a second embodiment of the present invention and shows a mode where a metal joint is formed at a metal structure.

An example of formation of a metal joint at a metal structure according to a second embodiment of the present invention is shown in FIG. 2. In the example shown in FIG. 2, a metal joint 2 having a joining surface part 5, tapered slanted part 6, and slanting surface 7 is formed at a metal structure constituted by a wall surface 22 of a wall 21.

An insert material 9 is adhered to the joining surface part 5, the metal pipe 3 is press-fit over the tapered slanted part 6 while being expanded, and this is heated to join the joining surface part 5 and the end face 8 of the metal pipe 3 by liquid phase diffusion bonding.

Further, as shown in FIG. 2, it is also possible to form a pipeline 23 inside the metal structure 21 and form a pipeline 24 connecting the pipeline 23 and metal pipe 3. In FIG. 2, the pipeline 23 is rotationally symmetric with respect to the axis of rotational symmetry 4, but the pipeline 23 is not limited to this.

Figure 3:
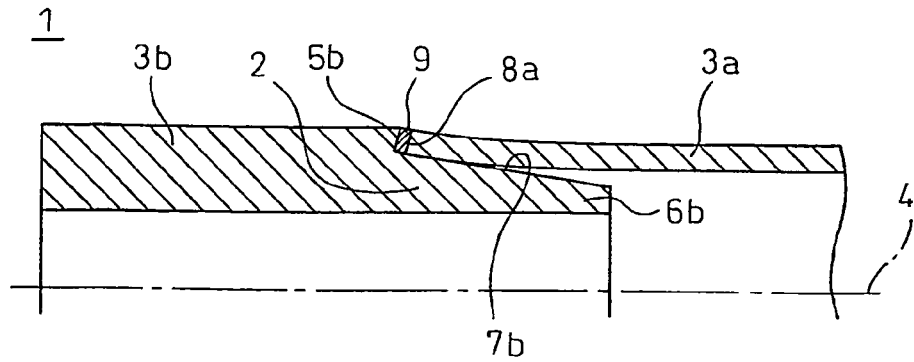
FIG. 3 is a view showing an example of a liquid phase diffusion bonded pipe joint according to a third embodiment of the present invention and shows a state where a metal joint is formed at an end of one metal pipe to be joined.

An example of forming a metal joint according to a third embodiment of the present invention at an end of a metal pipe is shown in FIG. 3. In the example shown in FIG. 3, a metal joint 2 having a joining surface part 5b and tapered slanted part 6b is formed at the end of a metal pipe 3b to be joined with a metal pipe 3a.

The liquid phase diffusion bonded pipe joint 1 is obtained by adhering the insert material 9 to the joining surface part 5b, press-fitting the metal pipe 3a over the tapered slanted part 6b while expanding it, then heating them to bond the joining surface part 5b and end face 8a of the metal pipe 3a by liquid phase diffusion bonding.

Figure 4:
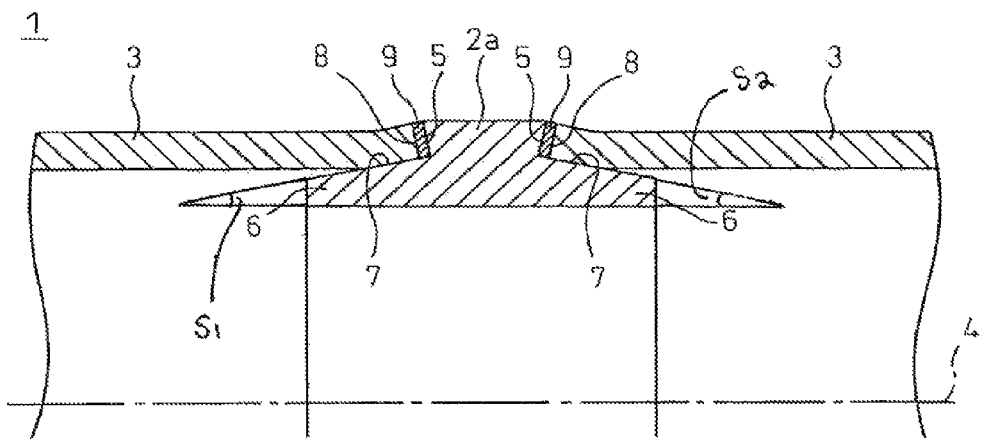
FIG. 4 is a view showing an example of a liquid phase diffusion bonded pipe joint according to a fourth embodiment of the present invention and shows a state of use of a metal joint point having tapered slanted parts at its two ends for joining two metal pipes.

An example where the metal joint is a metal joint pipe with a joining surface part provided at its center and with tapered slanted parts provided at its two sides according to a fourth embodiment of the present invention will be shown in FIG. 4.

In the example shown in FIG. 4, the metal joint is a metal joint pipe 2a with a joining surface part 5 provided at its center and with tapered slanted parts 6 provided continuing from the joining surface part 5 at its two sides.

Further, metal pipes 3 with expanded ends are press-fit over the tapered slanted parts 6 from the two sides of the metal joint pipe 2a, the end faces 8 of the metal pipes 3 are made to abut against the joining surface part 5 of the metal joint pipe 2a through insert materials 9, and these are heated to join the joining surface part 5 and the end faces 8 of the metal pipes 3 by liquid phase diffusion bonding whereby a liquid phase diffusion bonded pipe joint 1 is obtained.

Here, the inventors studied the suitable conditions of slant angles of slanted parts of a metal joint pipe and cross-sectional areas of metal pipes for obtaining surface pressures required for joining the metal pipes. As a result, it was learned that when the slant angle of one tapered slanted part of a metal joint pipe is $S_1$, a slant angle of the other tapered slanted part is $S_2$, a cross-sectional area of a metal pipe with an end tightly engaged with the tapered slanted part of the slant angle $S_1$ and with an end face joined to one surface of the center joining surface part by liquid phase diffusion bonding is $A_1$, and a cross-sectional area of a metal pipe with an end tightly engaged with the tapered slanted part of the slant angle $S_2$ and with an end face joined to the other surface of the center joining surface part by liquid phase diffusion bonding is $A_2$, if $S_1$, $S_2$, $A_1$, and $A_2$ satisfy the following formula (1), surface pressures necessary for joining the metal pipes are obtained and buckling of the metal pipes and a deterioration in the joining strengths of the joined parts can be prevented. Here, the cross-sectional area of a metal pipe indicates the area occupied by metal in the cross-section of a metal pipe. The area of the hollow part is not included.

$$0.8 \leq (S_1 \times A_1)/(S_2 \times A_2) \leq 1.2 \tag{1}$$

The relationship of the formula (1) can also be applied when $A_1$ and $A_2$ differ, that is, to a liquid phase diffusion bonded pipe joint joining metal pipes of different thicknesses.

Figure 5:
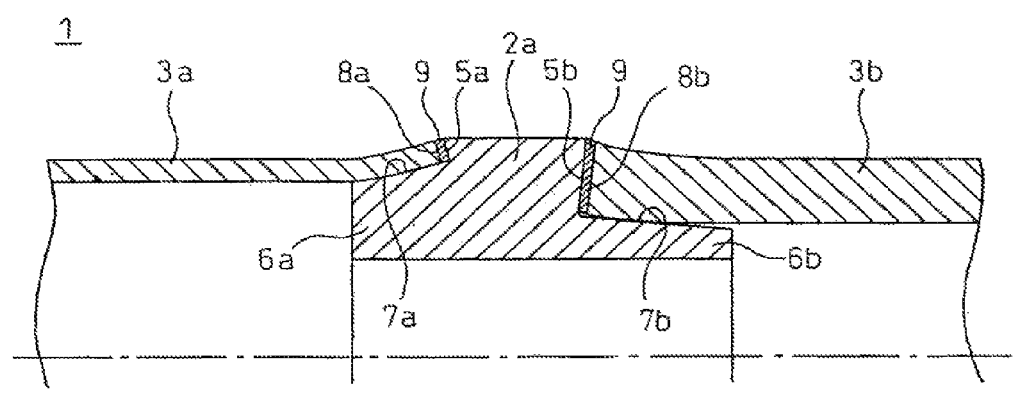
FIG. 5 is a view showing an example of a liquid phase diffusion bonded pipe joint according to a fifth embodiment of the present invention and shows a state of use of a metal joint pipe for joining metal pipes of the same diameters and different thicknesses.

An example of a liquid phase diffusion bonded pipe joint joining metal pipes of the same diameters and different thicknesses according to a fifth embodiment of the present invention is shown in FIG. 5.

FIG. 5 shows a liquid phase diffusion bonded pipe joint 1 comprised of a metal joint pipe 2a over which a thin-walled metal pipe 3a and a thick-walled metal pipe 3b are press-fit from the two sides.

As shown in FIG. 5, at the outside surface of the end of the metal joint pipe 2a at the thin-walled metal pipe 3a side, a tapered slanted part 6a is formed reduced in diameter toward the end. In the expanding direction of the tapered slanted part 6d, a joining surface part 5a against which the end face 8a of the thin-walled metal pipe 3a abuts is formed.

Further, at the outside surface of the end of the metal joint pipe 2a at the thick-walled metal pipe 3b side, a tapered slanted part 6b is formed reduced in diameter toward the end. In the expanding direction of the tapered slanted part 6b, a joining surface part 5b against which the end face 8b of the thin-walled metal pipe 3b abuts is formed.

When simultaneously joining metal pipes 3a and 3b with different wall thicknesses through a metal joint pipe 2a by liquid phase diffusion bonding, equal thrusts in the pipe axial direction are generated at the thin-walled metal pipe 3a and the thick-walled metal pipe 3b.

In this case, the buckling resistance is smaller with the thin-walled metal pipe 3a, so with a thrust in the pipe axial direction suitable for joining thin-walled metal pipes 3a of the same thicknesses, the thick-walled metal pipe 3b will sometimes not be contacted or even if contacted a sufficient surface pressure will not be obtained.

On the other hand, if applying a thrust in the pipe axial direction sufficient for joining thick-walled metal pipes 3b of the same thicknesses, the thin-walled metal pipe 3a will buckle and a suitable joint will not be obtained.

However, if the relationship of the formula (1) stands, that is, if making the slant angle of the tapered slanted part 6a at the thin-walled metal pipe 3a side larger than the slant angle of the tapered slanted part 6b at the thick-walled metal pipe 3b, the deformation resistance accompanying expanding of the thin-walled metal pipe 3a will become larger, a surface pressure necessary for joining thick-walled metal pipes 3b can be obtained, but the thin-walled metal pipe 3a will not buckle and a deterioration in the joining strength of the joined part at the thick-walled metal pipe 3b side can be prevented.

Further, at the end of the thin-walled metal pipe 3a, a thrust in the pipe axial direction is imparted in the heated state and the wall thickness increased, so the thickness of the pipe end of the thin-walled metal pipe 3a becomes larger than the average value of the thickness of the body of the thin-walled metal pipe 3a. As a result, the joined area of the end face 8a of the thin-walled metal pipe 3a and the joining surface part 5a of the metal joint pipe 2a increases, the joining strength rises, and joining strength of the strength of the body of the thin-walled metal pipe 3a or more is obtained even in the case of the liquid phase diffusion, bonded part of the thin-walled metal pipe 3a and the metal joint pipe 2a.

When the value of the formula (1) is over the upper limit value of 1.2, the thick-walled metal pipe 3b strongly tends to buckle. Further, even if buckling does not occur, the joined part of the thick-walled metal pipe 3b fractures in the tensile test. As opposed to this, when the value of the formula (1) is less than the lower limit value of 0.8, the thin-walled metal pipe 3a strongly tends to buckle. Further, even when buckling does not occur, the joined part of the thin-walled metal pipe 3a fractures in a tensile test.

Figure 6:
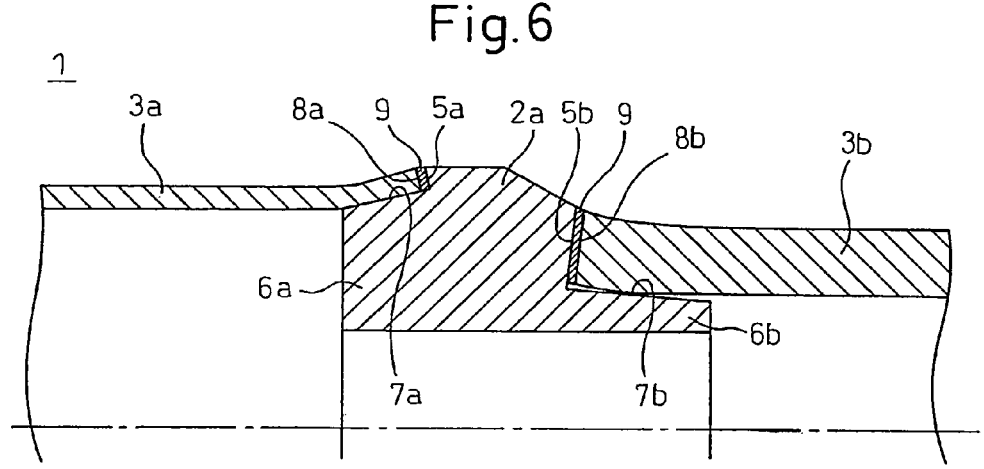
FIG. 6 is a view showing an example of a liquid phase diffusion bonded pipe joint according to a sixth embodiment of the present invention and shows a state of use of a metal joint pipe for joining metal pipes of different diameters and different thicknesses.

An example of a liquid phase diffusion bonded pipe joint joining metal pipes of different diameters and different thicknesses according to a sixth embodiment of the present invention is shown in FIG. 6.

FIG. 6 shows a liquid phase diffusion bonded pipe joint 1 comprised of a small cross-section metal pipe 3a comprised of a large diameter thin-walled metal pipe and a large cross-section metal pipe 3b comprised of a small diameter thick-walled metal pipe press-fit from the two ends of a metal joint pipe 2a.

Usually, in this case as well, the cross-sectional area $A_1$ of the small cross-section metal pipe 3a becomes smaller than the cross-sectional area $A_2$ of the large cross-sectional area metal pipe 3b. Due to this, in the same way as the liquid phase diffusion bonded pipe joint joining metal pipes of the same diameters and different thicknesses shown in FIG. 5, to prevent buckling of the small cross-section metal pipe 3a and a deterioration in joining strength at the large cross-section metal pipe 3b side, preferably the formula (1) is satisfied.

Figure 7:
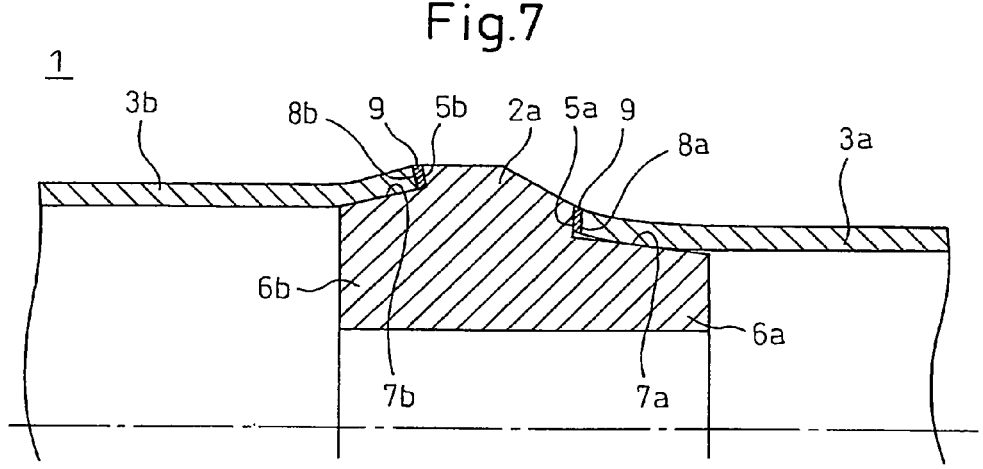
FIG. 7 is a view showing an example of a liquid phase diffusion bonded pipe joint according to a seventh embodiment of the present invention and shows a state of use of a metal joint pipe for joining metal pipes of different diameters and the same thicknesses.

Further, even in the case of a liquid phase diffusion bonded pipe joint joining metal pipes of different diameters and the same thicknesses according to a seventh embodiment of the present invention shown in FIG. 7, satisfaction of the formula (1) is preferable for preventing buckling of the small diameter metal pipe or a deterioration in joining strength of the joined part at the large diameter metal pipe side.

Figure 8:
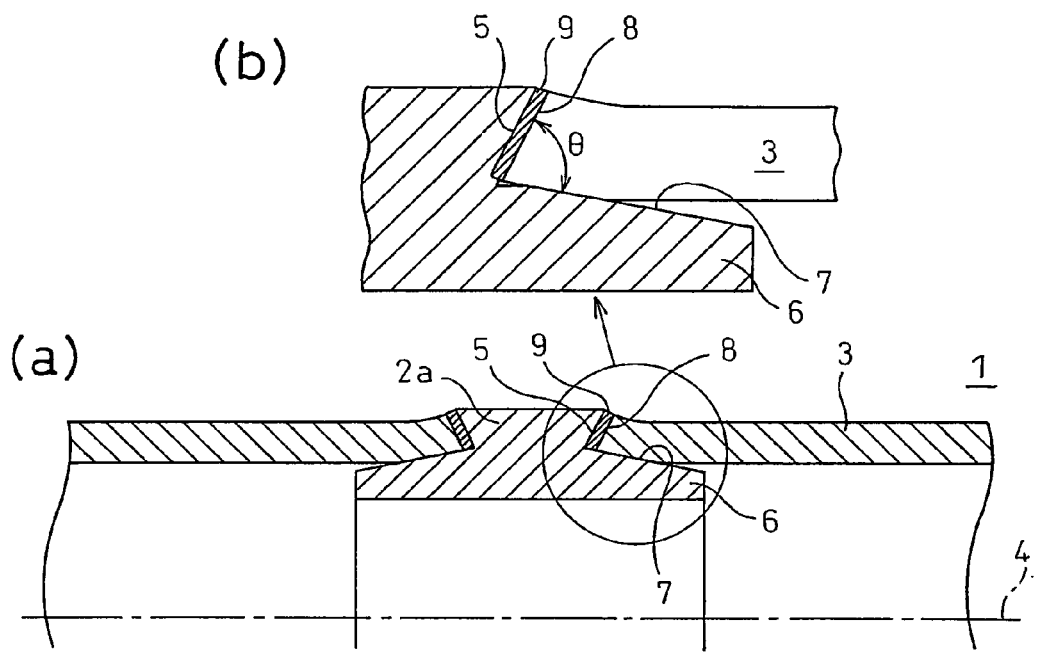
FIG. 8 is a view showing an angle formed by the joining surfaces and tapered slanted parts of a metal joint according to the present invention. (a) shows an example of a liquid phase diffusion bonded pipe joint, while (b) shows an angle at a joined part.

In the liquid phase diffusion bonded pipe joint of the present invention, the angle formed by the tapered slanted part and the joining surface part is preferably 70 to 110°. FIG. 8(a) and (b) show an example of a liquid phase diffusion bonded pipe joint 1 where an angle θ formed by the tapered slanted part 6 and joining surface part 5 is 70 to 110°. The angle θ formed by the tapered slanted part 6 and the joining surface part 5 is the angle formed by the joining surface of the joining surface part 5 and the slanting surface 7 of the tapered slanted part 6 in the cross-section of the liquid phase diffusion bonded pipe joint 1 in the pipe axial direction.

Figure 9:
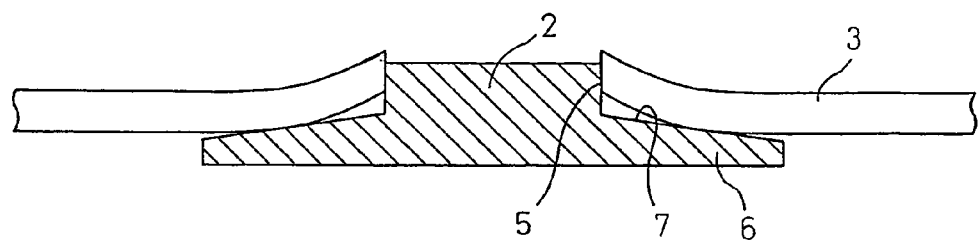
FIG. 9 is a view showing the state of ends of metal pipes abutting against the joining surface part of a metal joint being greatly expanded.
Figure 10:
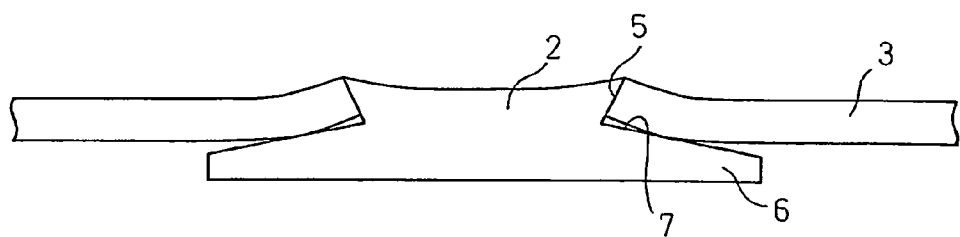
FIG. 10 is a view showing the state of the ends of metal pipes abutting against the joining surface part of a metal joint buckling.

If setting the angle θ formed by the tapered slanted part 6 and the joining surface part 5 in this way to 70 to 110°, at the time of joining, a large thrust can be applied in the pipe axial direction. When θ is larger than 110°, as shown in FIG. 9, the end of the metal pipe 3 is sometimes expanded greater than the joining surface part 5. Further, when θ is smaller than 70°, as shown in FIG. 10, the end of the metal pipe 3 sometimes buckles.

Next, a method of production of a liquid phase diffusion bonded pipe joint according to the present invention will be explained.

Figure 11:
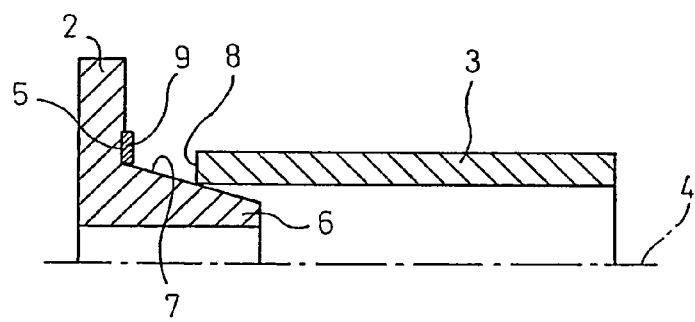
FIG. 11 is a view showing the state at the time of start of fitting a liquid phase diffusion bonded pipe joint according to a first embodiment of the present invention.

The liquid phase diffusion bonded pipe joint 1 shown in FIG. 1, for example, as shown in FIG. 11, is produced by adhering an insert material 9 in advance to the joining surface part 5, using a thrust in the pipe axial direction to press-fit the metal pipe 3 over the metal joint 2, and heating the joined part to a temperature higher than the melting point of the insert material 9 and lower than the melting point of the metal pipe 2 to cause the insert material 9 to melt for liquid phase diffusion bonding.

When press-fitting the metal pipe 3 over the metal joint 2, the inside surface of the end of the metal pipe 3 is expanded along the slanting surface 7 of the tapered slanted part 6 of the metal joint 2. Note that, the insert material 9 may also be adhered to the end face 8 of the metal pipe 3, but when the end of the metal pipe 3 is expanded, the insert material 9 may peel off, so it is preferably adhered to the joining surface part 5.

The inside diameter of the metal pipe 3 preferably has an inside diameter larger than the minimum outside diameter and smaller than the maximum outside diameter of the tapered slanted part 6. If designing the pipe to be expanded along with slanting surface 7 when press-fitting the end of the metal pipe 3 over the tapered slanted part 6 of the metal joint 2, it is no longer necessary to form a slanting surface at the inside surface of the end of the metal pipe 3 by lathe turning. As a result, it is possible to prevent a deterioration in the joining strength due to the error in machining precision when slant milling the metal pipe.

Further, the cross-sectional shape of the metal pipe 3 before being press-fit over the tapered slanted part 6 is not limited to a true circle. For example, even if an elliptical shape, the tapered slanted part 6 expands the end of the metal pipe 3, so the elliptical shape is corrected and the joining surface part 5 and the end face 8 of the metal pipe 3 can be reliably made to contact each other.

Figure 12:
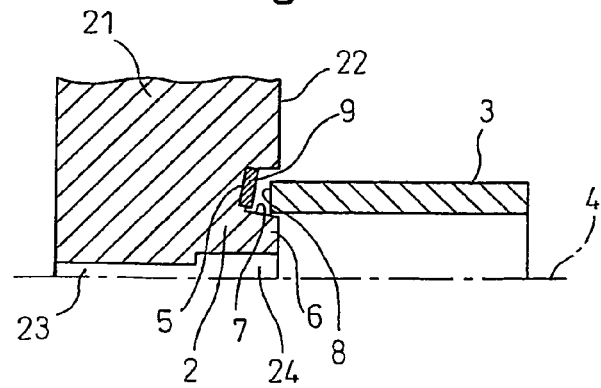
FIG. 12 is a view showing the state at the time of fitting a liquid phase diffusion bonded pipe joint according to a second embodiment of the present invention.

In the same way as the case where the metal joint 2 is formed at a metal structure 21, as shown in FIG. 12, an insert material 9 is adhered to the joining surface part 5 in advance, a thrust in the pipe axial direction is used to press-fit the metal pipe 3 over the metal joint 2, and the joined part is heated to a temperature higher than the melting point of the insert material 9 and lower than the melting point of the metal pipe 2 to make the insert material 9 melt for liquid phase diffusion bonding whereby it is possible to produce the liquid phase diffusion bonded pipe joint 1 shown in FIG. 2.

A second embodiment of the method of production of a liquid phase diffusion bonded pipe joint according to the present invention, that is, an example of joining a metal pipe and a metal pipe with a metal joint formed at an end, will be explained using FIG. 13 to FIG. 15.

Figure 13:
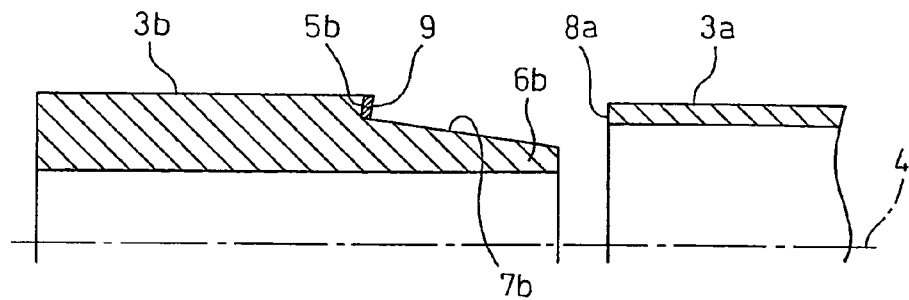
FIG. 13 is a view showing the state before joining a liquid phase diffusion bonded pipe joint according to a third embodiment of the present invention.

FIG. 13 illustrates a method of production of a liquid phase bonded pipe joint comprised of a thin-walled metal pipe 3a and a thick-walled metal pipe 3b. At the outside surface of the end of the thick-walled metal pipe 3b at the joining side, a joining surface part 5b and a tapered-slanted part 6b are provided. The thin-walled metal pipe 3a is attempted to be press-fit over the tapered slanted part 6b of the thick-walled metal pipe 3b. Here, the inside diameter of the thin-walled metal pipe 3a is larger than the minimum outside diameter and smaller than the maximum outside diameter of the front tapered part 6b of the thick-walled metal pipe 3b. In FIG. 13, the insert material 9 is adhered to the joining surface part 5b, but it may also be adhered to the end of the thin-walled metal pipe 3a.

Figure 14:
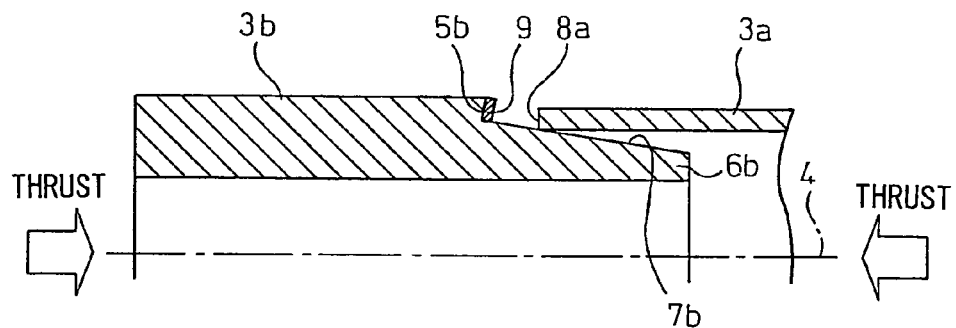
FIG. 14 is a view showing the state at the time of start of fitting a liquid phase diffusion bonded pipe joint according to a third embodiment of the present invention.

FIG. 14 shows the joining method. The inside surface of the end of the thin-walled metal pipe 3a is brought into contact with the slanting surface 7b of the slanted part 6b of the thick-walled metal pipe 3b. If further applying a thrust in the pipe axial direction, the end face 8a of the thin-walled metal pipe 3a is expanded along the slanting surface 7b and abuts against the joining surface part 5b of the thick-walled metal pipe 3b through the insert material 9.

Figure 15:
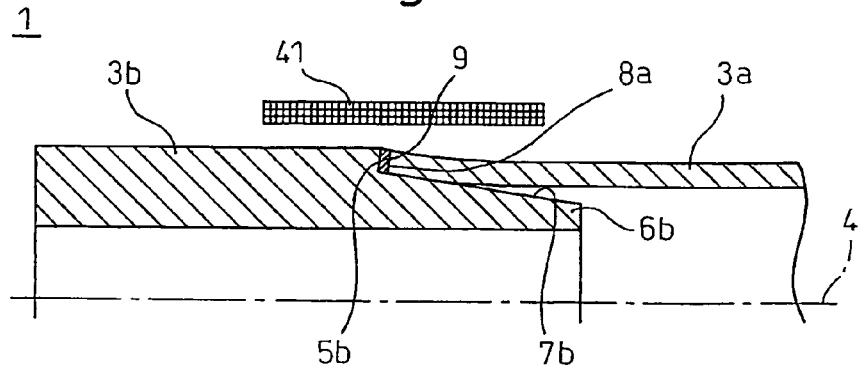
FIG. 15 is a view showing the start of heating a liquid phase diffusion bonded pipe joint according to a third embodiment of the present invention.

Furthermore, as shown in FIG. 15, for example, an induction heater 41 is used to heat the joining surfaces the end face 8a of the thin-walled metal pipe 3a and the joining surface part 5b to the melting point of the insert material 9 or more. After the elapse of a predetermined time, this is cooled.

For cooling the joined part, any of air cooling, fan cooling or other forced air cooling, or water cooling, mist cooling, or other controlled cooling may be employed. To ensure the strength of the joint after cooling, the faster the cooling speed, the better, but for water cooling or mist cooling, a controlled cooling system becomes necessary, so forced air cooling is preferred.

Figure 16:
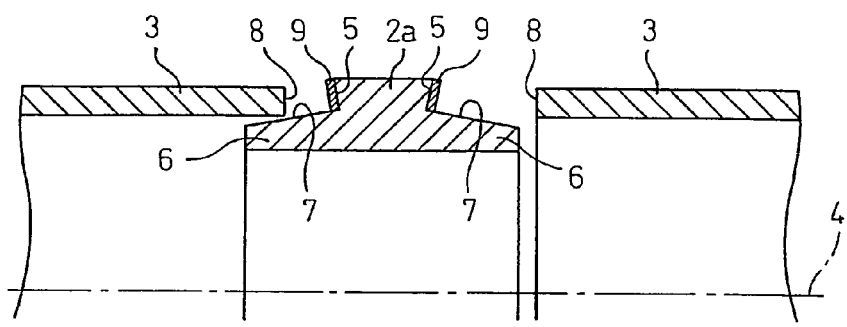
FIG. 16 is a view showing the state before joining a liquid phase diffusion bonded pipe joint according to a fourth embodiment of the present invention.

A third embodiment of a method of production of a liquid phase diffusion bonded pipe joint according to the present invention will be explained using FIG. 16 to FIG. 18. FIG. 16 shows the state of trying to press-fit metal pipes 3 over a metal joint pipe 2a from the two sides. The metal joint pipe 2a has tapered slanted parts 6 reduced in diameter toward the ends and has joining surface parts 5 against which the end faces 8 of the metal pipes 3 abut in a direction expanding the tapered slanted parts 6 (below, called the "slanted parts").

In the example shown in FIG. 16, a metal joint pipe 2a is used to join two metal pipes 3. For this, joining surface parts 5 and tapered slanted parts 6 extending from the joining surface parts 5 in the end face directions are provided at the outside surfaces of the two sides of the metal joint pipe 2a in the pipe axial direction. A flange-shaped ring-shaped member is formed projecting out from the center part of the metal joint pipe 2a. The two side surfaces of the ring-shaped member form joining surface parts 5 sticking out from the tapered slanted parts 6.

That is, the joining surface parts 5 are ring-shaped joining surface parts formed at the outer circumferential surface of the metal joint pipe 2a along the circumferential direction and has ring-shaped joining surfaces facing the directions of the end faces of the metal joint pipe 2a. The joining surfaces of the joining surface parts 5 are surfaces slanted from the surface of the metal joint pipe 2a vertical to the pipe axial direction toward the end face side. For example, In the cross-sectional view, shown in FIG. 16 etc., the joining surfaces of the joining surface parts 5 are substantially vertical to the slanting surfaces 7 of the tapered slanted parts 6. Due to this, the end faces 8 of the metal pipes 3 press-fit over the tapered, slanted parts 6 and the joining surface parts 5 can be suitably made to abut through the insert materials 9 without clearances.

Further, in FIG. 16, the insert materials 9 are adhered to the joining surface parts 5 in advance, but it is also possible to adhere the insert materials 9 to the end faces 8 of the metal pipes 3. However, if adhering the insert materials 9 to the end faces 8 of the metal pipes 3, when the ends of the metal pipes 3 are expanded, there is a possibility of the insert materials 9 peeling off, so the materials are preferably adhered to the joining surface parts 5.

Figure 17:
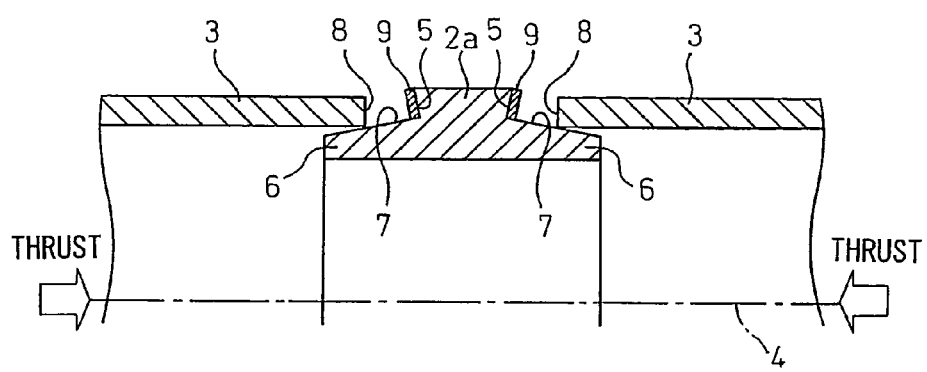
FIG. 17 is a view showing the state at the time of start of fitting a liquid phase diffusion bonded pipe joint according to a fourth embodiment of the present invention.

FIG. 17 shows the state of press-fitting metal pipes 3 over a metal joint pipe 2a by a thrust in the pipe axial direction from the state shown in FIG. 16. In FIG. 17, the slanting surfaces 7 of the tapered slanted parts 6 of the metal joint pipe 2a and the inside surfaces of the ends of the metal pipes 3 are in contact. If further applying a thrust, the end faces 8 of the metal pipes 3 are expanded along the slanting surfaces 7 and the end faces 8 of the metal pipes 3 abut against the joining surface parts 5 of the metal joint pipe 2a through the insert materials 9.

Figure 18:
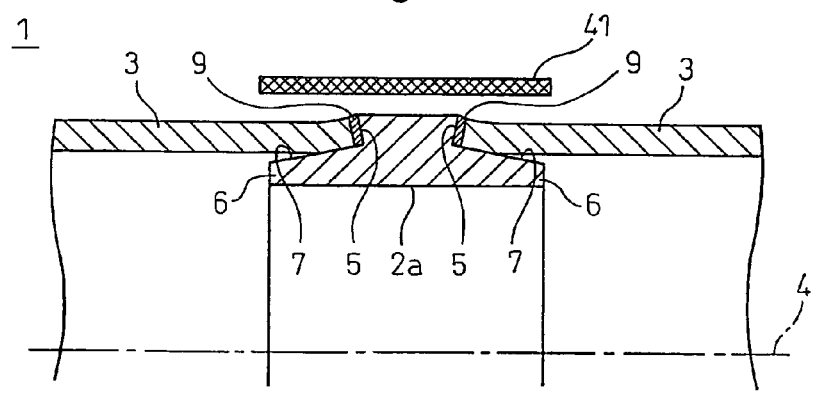
FIG. 18 is a view showing the state of heating a liquid phase diffusion bonded pipe joint according to a fourth embodiment of the present invention.

Furthermore, as shown in FIG. 18, for example, an induction heater 41 or other heating means is used to heat the joining surfaces to a temperature higher than the melting point of the insert materials 9 and lower than the melting point of the metal pipes 3 so that the insert materials 9 melt, then the joined parts are cooled. For cooling the joined parts, air cooling, fan cooling, or other forced air cooling or water cooling, mist cooling, or other controlled cooling may be employed. To ensure the strength of the joint after cooling, a faster cooling speed is preferable, but water cooling or mist cooling requires a controlled cooling system, so forced air cooling is preferable.

Figure 19:
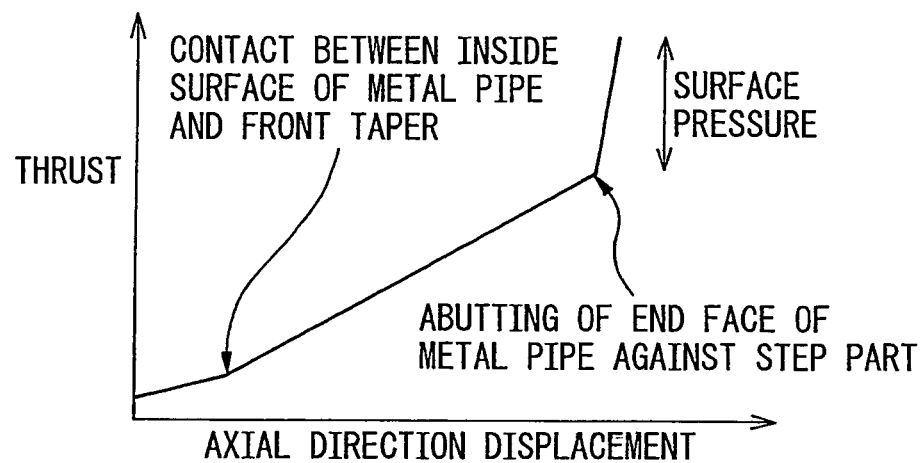
FIG. 19 is a view showing the relationship between displacement in a metal pipe axial direction and a thrust in the pipe axial direction and a magnitude of surface pressure between the end face of a metal pipe and a joining surface part of a metal joint.

The relationship between the thrust when imparting a thrust in the pipe axial direction against a metal pipe 3 and press-fitting it over a tapered slanted part 6 of the metal joint pipe 2a and the displacement in the pipe axial direction of the metal pipe 3 is shown in FIG. 19. The increase in displacement in the pipe axial direction means that the end face 8 of the metal pipe 3 moves along the joining surface part 5 of the metal joint pipe 2a.

As shown in FIG. 19, if the displacement in the pipe axial direction increases, first, the inside surface of the end of the metal pipe 3 contacts the outside surface of the tapered slanted part 6. After this, frictional force occurs, so the increase in the thrust in the pipe axial direction becomes larger and the slant of the line becomes larger with respect to the displacement in the axial direction.

If the displacement in the pipe axial direction further increases, the end face 8 of the metal pipe 3 abuts against the joining surface part 5 of the metal joint pipe 2a through the insert material 9. If the displacement in the pipe axial direction further increases, surface pressure is generated at the abutting part of the end face 8 of the metal pipe 3 and the joining surface part 5 of the metal joint pipe 2a.

After the joining surface part 5 and the end face 8 of the metal pipe 3 abut, if releasing the thrust in the pipe axial direction, the surface pressure at the abutting part of the joining surface part 5 and the end face 8 of the metal pipe 3 falls somewhat, but is maintained by the friction between the slanting surface 7 and the inside surface of the metal pipe 3.

However, depending on the heating conditions, maintaining the surface pressure of the abutting part of a joining surface part 5 and an end face 8 of a metal pipe 3 is sometimes difficult. To obtain a strong joining strength, at the time of heating, it is preferable to further apply a thrust in the pipe axial direction to maintain the surface pressure. Further, at the time of heating, it is also effective to constrain displacement in the pipe axial direction, generate a thrust due to thermal stress, and maintain the surface pressure.

For the heating of the joining surfaces for causing the insert material 9 to melt, for example, other than the induction heating system, furnace heating, electrical resistance heating, and ohmic heating may be employed.

Further, when joining two metal pipes through a metal joint, when a slant angle of one tapered slanted part of the metal joint pipe is $S_1$, a slant angle of the other tapered slanted part is $S_2$, a cross-sectional area of a metal pipe with an end tightly engaged with the tapered slanted part of the slant angle $S_1$ and with an end face joined to one surface of the center joining surface part by liquid phase diffusion bonding is $A_1$, and a cross-sectional area of a metal pipe with an end tightly engaged with the tapered slanted part of the slant angle $S_2$ and with an end face joined to the other surface of the center joining surface part by liquid phase diffusion bonding is $A_2$, making $S_1$, $S_2$, $A_1$, and $A_2$ satisfy the relationship of the formula (1) to produce a liquid phase diffusion bonded pipe joint is preferable for obtain a surface pressure required for joining.

Even when the thicknesses of the two metal pipes are different, similarly satisfying the relationship of the formula (1) to produce a liquid phase diffusion bonded pipe joint is preferable for obtaining a surface pressure required for joining.

Here, the effects of the expanding diameter and increase of thickness of the end of a metal pipe will be explained using specific examples.

Figure 20:
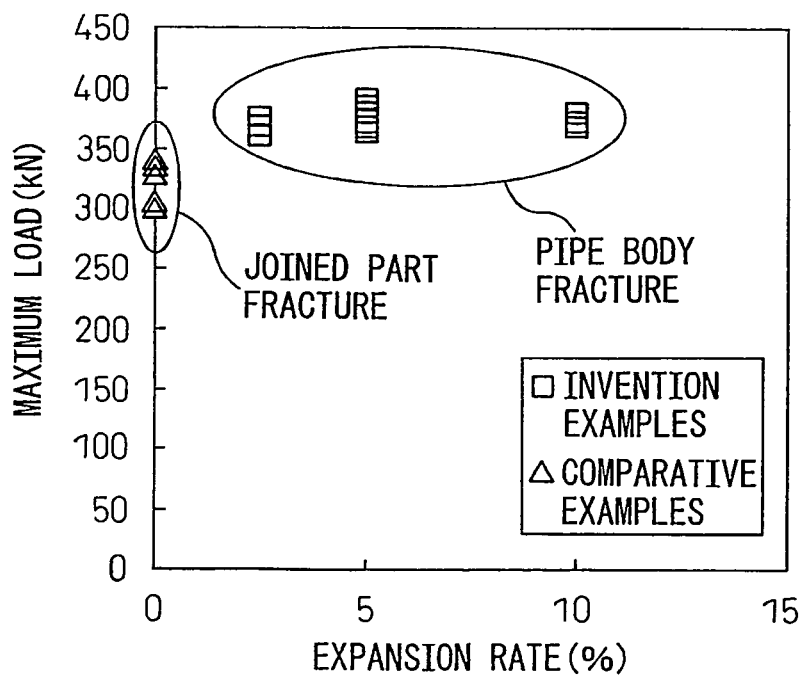
FIG. 20 is a view showing a maximum load at the time of a tensile test of a liquid phase diffusion bonded pipe joint by the relationship with an expansion ratio.

Metal pipes comprised of steel pipes having outside diameters of 76.3 mm, wall thicknesses of 4 mm, and material grades of STKM13 were press-fit over metal joints from the two ends of the metal joints with an expansion ratio of 2.5 to 10% and a cross-sectional area ratio of 1.05 to 1.19 to produce liquid phase diffusion bonded pipe joints which were then used for tensile tests. The result, that is, the relationship between the maximum strengths (joining strengths) and the expansion ratios of the ends of the metal pipes, is shown in FIG. 20. The comparative examples of FIG. 20 are joints obtained by liquid phase diffusion bonding without expanding the diameters and increasing the wall thicknesses of the steel pipes.

The liquid phase diffusion bonded pipe joints according to the embodiments of the present invention fractured from the bodies of the metal pipes, but the joints not expanded and increased in wall thickness according to the comparative examples all fractured from the joined parts of the end faces of the steel pipes and the joining surface parts.

Further, it was confirmed that when the bodies fractured at the joints according to the present embodiments, the maximum loads were larger and the joining strengths were higher than when the joined parts fractured at the joints according to the comparative examples.

Furthermore, as other specific examples, steel pipes with outside diameters of 76.3 mm, wall thicknesses of 4 mm, and material grades of STKM13A were used to produce liquid phase diffusion bonded pipe joints of the shapes shown in FIG. 21A, FIG. 21B, and FIG. 21C (below, respectively, "joint A", "joint B", and "joint C") which were then subjected to tensile tests. For the insert material, an Ni-based amorphous alloy containing, by at %, Si: 3.5% and B: 3.0% was used.

Note that, thrusts in the pipe axial direction were applied to the end faces of the steel pipes so that the surface pressures become 5 and 10 MPa, then released, then the pipes were heated to 1200° C. and held there for 10 minutes, then cooled. The heating temperature of 1200° C. is an example higher than the temperature for making the joined parts melt, that is, higher than the liquidus of the insert material and lower than the melting point of the joined members, that is, the metal pipes.

The joint A (embodiment of present invention) has a material grade of the metal joint pipe of SS400, a maximum outside diameter of the tapered slanted parts of the metal joint pipe of 82.3 mm, a minimum outside diameter of 71.7 mm, a slant angle (angle between slanting surface and axis of rotational symmetry) of 7°, and a length of the tapered slanted parts in the axial direction of 30 mm.

The joint B (comparative example) has a material grade and maximum value of the outside diameter the same as the joint A and is made a cylindrical shape without providing the tapered slanted parts at the two ends of the metal joint pipe. The outside diameters of the metal joint pipe at the abutting parts were made substantially the same as the inside diameters of the steel pipes.

The joint C (comparative example) is an example interposing an insert material at the abutting parts of steel pipes without using a metal joint pipe.

The joints A to C were joined at 5 and 10 MPa surface pressures, subjected to tensile loads until the joints or pipe bodies fractured, and measured for maximum loads. The results are shown in FIG. 22. The joining strength in each case was higher than the prescribed yield strength, but the joint B and the joint C did not satisfy the prescribed tensile strength. Further, both the joint B and the joint C fractured from the join interfaces. As opposed to this, in the liquid phase diffusion bonded pipe joint according to an embodiment of the present invention, that is, the joint A, the maximum load exceeded the prescribed strength. Breakage occurred from the pipe body.

In the above way, it could be verified that even if the joining surface pressures and the temperature histories are the same, liquid phase diffusion bonded pipe joints according to embodiments of the present invention have high joining strengths.

Liquid phase diffusion bonded pipe joints according to embodiments of the present invention can avoid uneven joining surface pressures at the pipe end faces. When applying tensile stresses to the joints, the vicinities of the joining surfaces becomes resistant to shrinkage after yielding and the stress concentrations can be reduced, so fractures at the join interfaces can be avoided. Further, as an advantage in actual operation, by press-fitting the inside surfaces of the metal pipes, for example, the inside surfaces of the steel pipes, along the slanting surfaces of the metal joint pipes, centering becomes easier.

Figure 23:
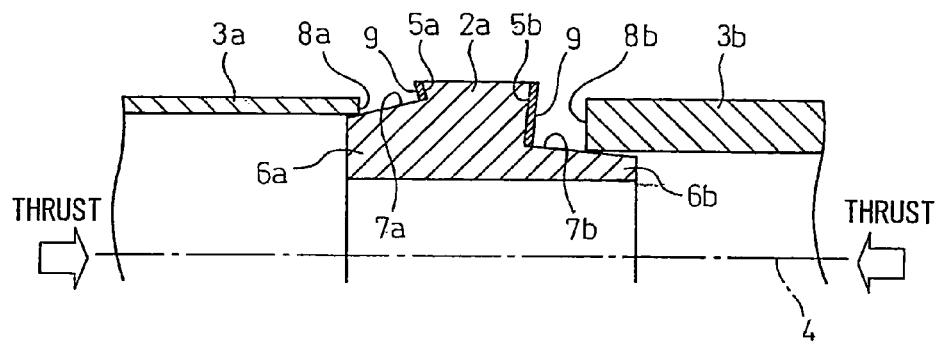
FIG. 23 is a view showing the state before joining a liquid phase diffusion bonded pipe joint according to a fifth embodiment of the present invention.
Figure 24:
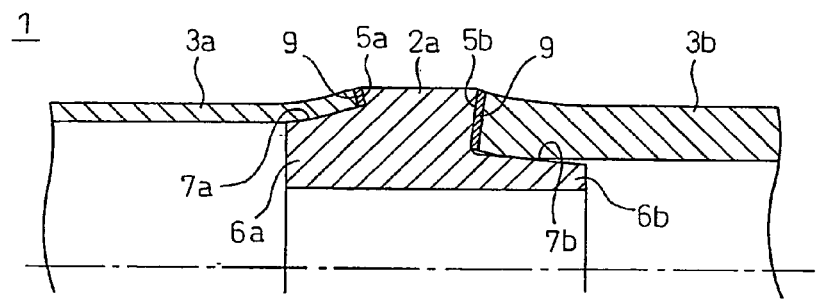
FIG. 24 is a view showing the state after joining a liquid phase diffusion bonded pipe joint according to a fifth embodiment of the present invention.

In the present invention, it is important to press-fit the metal pipes while expanding their ends. When the metal pipes press-fit from the two sides of a metal joint pipe differ in wall thickness, for example, in the embodiments shown in FIG. 23 and FIG. 24, even if respectively having joining surface parts 5a and 5b and tapered slanted parts 6a and 6b of different shapes at the two sides of the metal joint pipe 2a, these are included in the technical scope of the present invention so long as the metal pipes 3a and 3b are expanded at the time of press-fitting.

Figure 25:
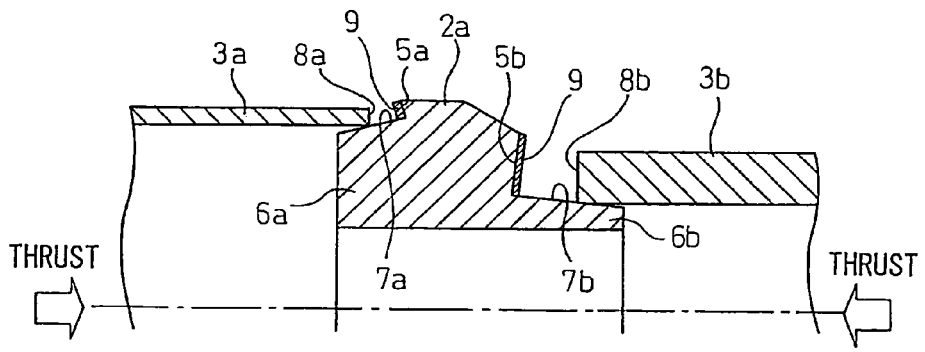
FIG. 25 is a view showing the state before joining a liquid phase diffusion bonded pipe joint according to a sixth embodiment of the present invention.
Figure 26:
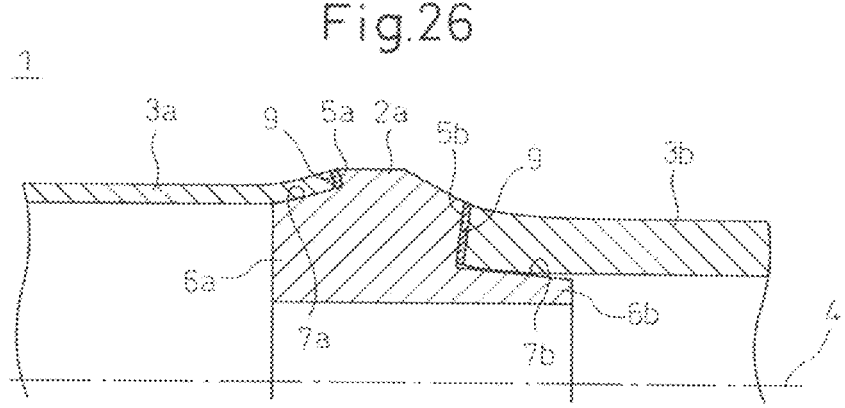
FIG. 26 is a view showing the state after joining a liquid phase diffusion-bonded pipe joint according to a sixth embodiment of the present invention.

Furthermore, when the metal pipes press-fit from the two sides differ in outside diameter, for example, as shown in FIG. 25 and FIG. 26, even if the joining surface parts 5a and 5b differ in outside diameter, these are included in the technical scope of the present invention so long as the metal pipes 3a and 3b are expanded at the time of press-fitting.

Further, as shown in FIG. 23 to FIG. 26, by making the heights of the joining surface parts 5a and 5b of a metal joint pipe 2a substantially the same as the wall thicknesses of the joined metal pipes 3a and 3b, the two can be joined well so that none of the ends of the metal pipes 3a and 3b or joining surface parts 5a and 5b stick out after joining.

In the embodiments of the liquid phase diffusion bonded pipe joints of the present invention, when joining a joining surface part of a metal joint and an end face of a metal pipe by liquid phase diffusion bonding, the surface pressure of the abutting parts of the joining surface part and end face is preferably made 5 to 20 MPa in range.

The surface pressure, as shown in FIG. 19, was found by dividing the amount of increase of the thrust in the pipe axial direction over the thrust in the pipe axial direction when the joining surface part of the metal joint and the end face of the metal pipe abutted by the area of the abutting parts.

Figure 27:
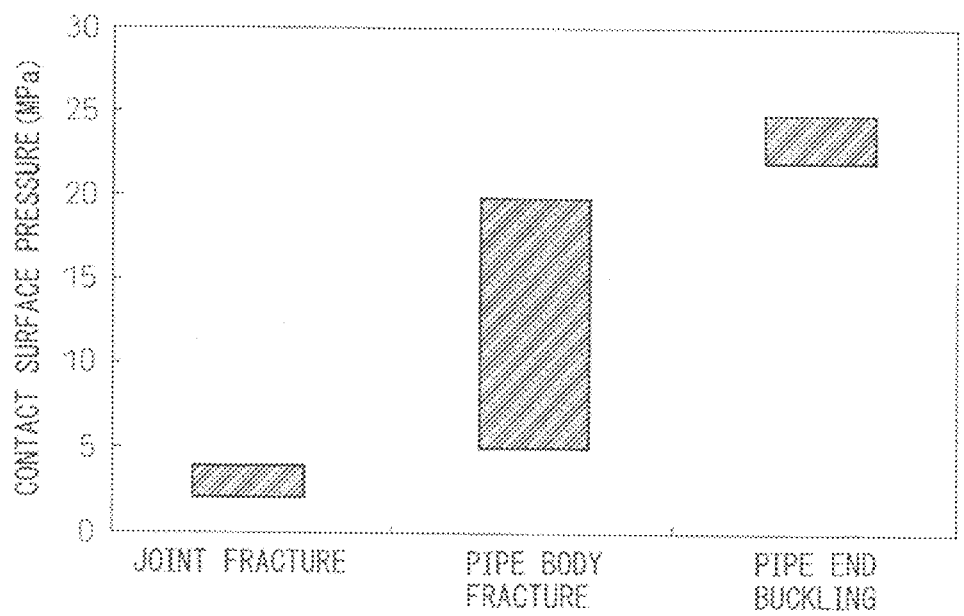
FIG. 27 is a view showing the relationship between the occurrence of buckling at a liquid phase diffusion bonded pipe joint and results of tensile tests and the surface pressure of the end face of a metal pipe and the joining surface part of a metal joint at the time of joining.

FIG. 27 shows the surface pressure at which buckling occurs due to the thrust in the pipe axial direction at the time of heating metal pipes of liquid phase diffusion bonded pipe joints, the surface pressure at which fracture occurs at the joining surfaces when applying tensile stress to liquid phase diffusion bonded pipe joints at which no buckling occurred, and the surface pressure at which fracture occurred at the pipe body parts.

If making the surface pressure 22 MPa, before the bonding temperature readies 1200° C., the load starts to fall and the pipe end part buckles. If making the surface pressure 5 to 20 MPa, in the tensile test, all pieces fractured at the pipe bodies. With a surface pressure of 4 MPa or less, as a result of the tensile tests, the pieces fractured from the joining surfaces. From these results, it is learned that the surface pressure is preferably 5 to 20 MPa in range.

Further, the timing of the start of heating of the abutting parts is not particularly limited. It is possible to apply the thrust in the pipe axial direction after the start of heating, but by starting the heating after making the joining surface of a metal joint and the end face of a metal pipe abut, it is possible to limit the oxidation at the contact surfaces to a minimum.

Furthermore, the heating temperature is not particularly limited, but 1150 to 1250° C. is preferred.

In the embodiments of the present invention, the insert material is formed by an amorphous metal or amorphous alloy etc. A foil of an amorphous metal or amorphous alloy is preferable. In this embodiment, it is important to interpose the amorphous metal or amorphous alloy at the joining surfaces and heat while maintaining the surface pressure. Other than a foil, a powder, flakes, plating, etc. may also be used. The thickness of the insert material is not particularly limited, but in the case of a foil, 10 to 50 μm is preferable. A plurality of sheets of foils may also be used superimposed.

The insert material is not particularly limited, but when the metal joint and metal pipes are steel pipes, an Ni-based or Fe-based amorphous alloy is preferable. As examples of an Ni-based or Fe-based amorphous alloy, there are foils containing, by at %, one or more of 2 to 10% of Si, 2 to 10% of B, 2 to 10% of V, 2 to 5% of P, and 2 to 5% of C and having a balance of Ni or Fe produced by the rapid cooling and solidification method.

Further, even if the insert material is interposed only at the abutting parts, a liquid phase diffusion bonded pipe joint sufficiently excellent in joining strength is obtained, but it may also be interposed between a slanting surface and the inside surface of a metal pipe. When interposing an insert material between a slanting surface and an inside surface of the metal pipe, the insert material may be a plating so as not to be peeled off due to rubbing.

Above, preferred embodiments of the present invention were explained, but the embodiments are illustrations. The present invention should not be interpreted limited to the above embodiments and the examples shown below. It is clear that someone having ordinary knowledge in the field of art to which the present invention belongs can easily make various modifications and corrections within the scope of the technical idea of the present invention. It will be understood that these too naturally fall under the technical scope of present invention.

Example 1

Metal pipes 3 were press-fit over tapered slanted parts 6 of metal joints 2 shown in FIG. 11 while being expanded and insert materials 9 were used and liquid phase diffusion bonding performed to obtain liquid phase diffusion bonded pipe joints 1 shown in FIG. 1.

At joining surface parts 5 of the metal joints 2, insert materials 9 comprised of an Ni-based amorphous metal (Si: 3.5 at %, B: 3.0 at %, and balance: Ni and unavoidable impurities, below, "Ni-based 1", same in the table) were adhered and held.

The expansion ratios when press-fitting the metal pipes 3 over the tapered slanted parts were made 2 or 5%. The end faces 8 of the metal pipes 3 were made to abut against wall surfaces corresponding to the joining surface parts 5 to impart 5 to 20 MPa surface pressures, then induction heating was used to heat the vicinities of the joining surfaces to 1100° C. or 1200° C. to produce liquid phase diffusion bonded pipe joints 1.

Table 2 shows the characteristics of the metal pipes 3 and metal joints 2 and the production conditions of the liquid phase diffusion bonded pipe joints 1.

Among the produced liquid phase diffusion bonded pipe joints, the test pieces A1 to A3 were used for tensile tests, whereupon all fractured at the bodies of the metal pipes 3. Further, the test pieces A4 to A6 were used for bending tests, whereupon all buckled at the bodies of the metal pipes 3.

For comparison, metal pipes 3 were press-fit over tapered slanted parts 6 without expansion and insert materials 9 were used to produce liquid phase diffusion bonded pipe joints 1. The results are shown as the test pieces B1 to B6 of Table 1.

The test pieces B1, B2, and B4 in Table 1 are examples where the ends of the metal pipes 3 were press-fit in advance over the tapered slanted parts 6, but the inside diameters of the ends of the metal pipes 3 were kept from being expanded when being press-fit over the tapered slanted parts 6 by making the inside diameters of the ends of the metal pipes 3 somewhat larger than the outside diameters of the tapered slanted parts 6 of the metal joints 2.

The test pieces B3, B5, and B6 in Table 1 are examples of making the end faces 8 of the metal pipes 3 directly abut against the wall surfaces corresponding to the joining surface parts 5 through insert materials 9 without expanding the metal pipes 3. After this, they were fixed in positions in the pipe axial directions and given 5 to 20 MPa surface pressures, then induction heating was used to heat the vicinities of the joining surfaces to 1100° C. or 1200° C.

The test piece 11 buckled during heating at the metal pipe 3, so a liquid phase diffusion bonded pipe joint 1 could not be produced.

The test pieces 7 to 9 were used for tensile tests, whereupon all of the test pieces fractured from the joining surfaces. Further, the test pieces 10 and 12 were used for bending tests, whereupon both test pieces fractured from the joining surfaces.

TABLE 1

| | | Metal pipe | | | Metal joint | | | | Joining conditions | | | | |
| --- | --- | --- | --- | --- | --- | --- | --- | --- | --- | --- | --- | --- | --- |
| | | Outside diameter (mm) | Wall thickness (mm) | Material | Taper | Tapered slanted part | | | Expansion ratio % | Insert material | Join | | |
| | | | | | | Length (mm) | Max. dia. (mm) | Min. dia. (mm) Material | | | Joining surface pressure MPa | Joining temperature ° C. | Heating time min | Tensile test Fracture location |
| Inv. ex. | A1 | 76.3 | 4 | STKM13A | 1/4 | 38.7 | 69.67 | 60 SS400 | 2 | Ni-based 1 | 5 | 1200 | 1 | Pipe body |
| | A2 | | | | | | | | | | 10 | 1200 | 1 | Pipe body |
| | A3 | | | | | | | | | | 20 | 1200 | 1 | Pipe body |
| | A4 | 355.9 | 7.9 | STK400 | 1/8 | 456.8 | 357.11 | 300 SS400 | 5 | Ni-based 1 | 5 | 1100 | 2 | Pipe body buckling |

TABLE 1-continued

| | | Metal pipe | | | Metal joint | | | | | Joining conditions | | | | |
|---|---|---|---|---|---|---|---|---|---|---|---|---|---|---|
| | | | | | Tapered slanted part | | | | Expansion ratio % | Insert material | Joining surface pressure MPa | Join temperature ° C. | Heating time min | Tensile test Fracture location |
| | | Outside diameter (mm) | Wall thickness (mm) | Material | Taper | Length (mm) | Max. dia. (mm) | Min. dia. (mm) | Material | | | | | |
| | A5 | | | | | | | | | | | 10 | 1100 | 2 | Pipe body buckling |
| | A6 | | | | | | | | | | | 2 | 1100 | 2 | Pipe body buckling |
| Comp. ex. | B1 | 76.3 | 4 | STKM13A | 0 | 38.7 | 67.30 | 67.3 | SS400 | 2 | Ni-based 1 | 15 | 1100 | 3 | Joining surface fracture |
| | B2 | | | | 0 | 38.7 | 67.30 | 67.3 | | | | 15 | 1200 | 1 | Joining surface fracture |
| | B3 | | | | No tapered slanted part | | | | | | | 20 | 1200 | 1 | Joining surface fracture |
| | B4 | 355.9 | 7.9 | STK400 | 0 | 456.8 | 339.10 | 339.1 | SS400 | 5 | Ni-based 1 | 5 | 1100 | 2 | Joining surface fracture |
| | B5 | | | | No tapered slanted part | | | | | | | 25 | 1100 | 2 | Joining surface fracture |
| | B6 | | | | No tapered slanted part | | | | | | | 20 | 1100 | 2 | Joining surface fracture |

Example 2

Figure 28:
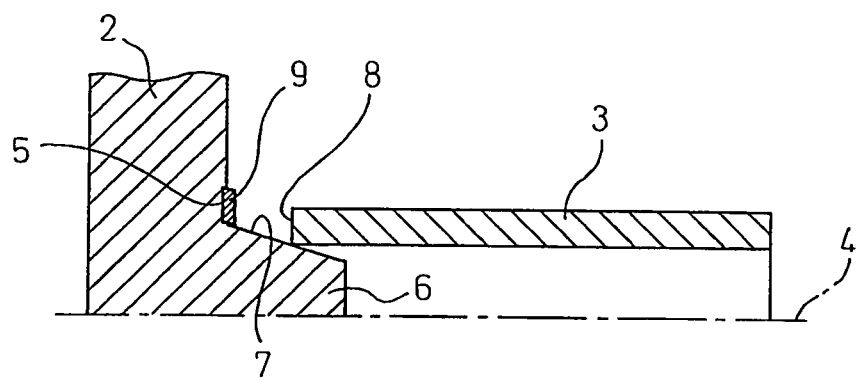
FIG. 28 is a view showing the state at the time of start of fitting a modification of a liquid phase diffusion bonded pipe joint according to a first embodiment of the present invention, that is, a liquid phase diffusion bonded pipe joint according to Example 2.
Figure 29:
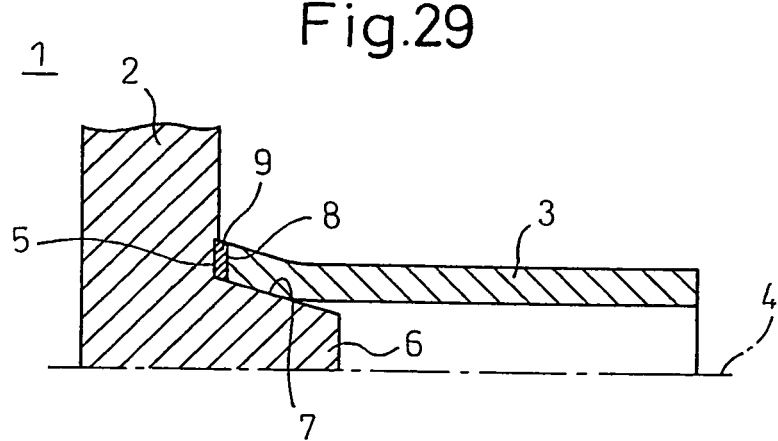
FIG. 29 is a view showing a modification of a liquid phase diffusion bonded pipe joint according to a first embodiment of the present invention, that is, a liquid phase diffusion bonded pipe joint according to Example 2.

As shown in FIG. 28, metal joints 2 were provided with tapered slanted parts 6, metal pipes 3 were press-fit over the tapered slanted parts 6 while being expanded, and insert materials 9 were used and liquid phase diffusion bonding performed to obtain liquid phase diffusion bonded pipe joints 1 shown in FIG. 29.

At the joining surface parts 5 of the metal joints 2, as insert materials 9, Ni-based amorphous metal (Si: 3.0 at %, B: 3.0 at %, V: 2.5 at %, balance: Ni and unavoidable impurities, below, "Ni-based 2", same in the table) were adhered and held.

The expansion ratios when press-fitting the metal pipes 3 over the tapered slanted parts were made 2.5 or 5%. The end faces 8 of the metal pipes 3 were made to abut against wall surfaces corresponding to the joining surface parts 5 to impart 5 to 20 MPa surface pressures, then induction heating was used to heat the vicinities of the joining surfaces to 1200° C. to produce liquid phase diffusion bonded pipe joints 1.

Table 2 shows the characteristics of the metal pipes 3 and metal joints 2 and the production conditions of the liquid phase diffusion bonded pipe joints 1.

Among the produced liquid phase diffusion bonded pipe joints, the pipe ends of the metal pipes 3 of the test pieces C1 to C3 were threaded, fittings for tensile tests were attached, and the pieces were used for tensile tests. As a result, all test pieces fractured from the threaded parts.

For comparison, metal pipes 3 were press-fit over tapered slanted parts 6 without expansion and insert materials 9 were used to produce liquid phase diffusion bonded pipe joints 1. The results are shown as the test pieces D1 to D3 of Table 2.

The test piece D1 is an example which has a tapered slanted part 6, but when even a metal pipe 3 is press-fit over it, the metal pipe 3 is not expanded, while the test pieces D2 and D3 are examples where the end faces 8 of the metal pipes 3 are made to directly abut against the wall surfaces corresponding to the joining surface parts 5 through the insert materials 9.

After this, they were fixed in positions in the pipe axial directions, given 5 to 20 MPa surface pressures, then induction heating was used to heat the vicinities of the joining surfaces to 1100° C. or 1200° C. to produce liquid phase diffusion bonded pipe joints 1.

The test pieces D1 to D3 were threaded for tensile tests and used for tensile tests, whereupon all test pieces fractured from the joining surfaces.

TABLE 2

| | | Metal pipe | | | Metal joint | | | | | Joining conditions | | | | |
|---|---|---|---|---|---|---|---|---|---|---|---|---|---|---|
| | | | | | Tapered slanted part | | | | Expansion ratio % | Insert material | Joining surface pressure MPa | Join temp. ° C. | Heating time min | Tensile test Fracture location |
| | | Outside diameter (mm) | Wall thickness (mm) | Material | Taper | Length (mm) | Max. dia. (mm) | Min. dia. (mm) | Material | | | | | |
| Inv. ex. | C1 | 89 | 8 | SGP | 1/16 | 189.2 | 74.83 | 63 | SS400 | 2.5 | Ni-based 2 | 5 | 1200 | 5 | Threaded part |
| | C2 | | | | 1/6 | 81.9 | 76.65 | 63 | | 5 | | 10 | 1200 | 5 | Threaded part |
| | C3 | | | | | | | | | | | 20 | 1200 | 5 | Threaded part |
| Comp. ex. | D1 | 89 | 8 | SGP | 0 | 0.0 | 72.00 | 72 | SS400 | 0 | Ni-based 2 | 5 | 1200 | 5 | Joining surface fracture |

TABLE 2-continued

| | Metal pipe | | | Metal joint | | | | Joining conditions | | | | | |
|---|---|---|---|---|---|---|---|---|---|---|---|---|---|
| | Outside | Wall | | Tapered slanted part | | | | Expan- | | Joining | | Heat- | |
| | di-ameter (mm) | thick-ness (mm) | Material | Taper | Length (mm) | Max. dia. (mm) | Min. dia. (mm) Material | sion ratio % | Insert material | surface pressure MPa | Join temp. ° C. | ing time min | Tensile test Fracture location |
| D2 | | | | No tapered slanted part | | | | | | 10 | 1200 | 5 | Joining surface fracture |
| D3 | | | | | | | | | | 20 | 1200 | 5 | Joining surface fracture |

Example 3

As shown in FIG. 12, tapered slanted parts 6 were provided in metal structures, that is, walls 21, metal pipes 3 were press-fit over the tapered slanted parts 6 while being expanded, and insert materials 9 were used and liquid phase diffusion bonding performed to obtain liquid phase diffusion bonded pipe joints 1 shown in FIG. 2.

At the joining surface parts 5 of the metal joints 2, as insert materials 9, Ni-based 1 were adhered and held. The expansion ratios when press-fitting the metal pipes 3 over the tapered slanted parts were made 2% or 5%.

The end faces 8 of the metal pipes 3 were made to abut against the wall surfaces corresponding to the joining surface parts 5 to impart 15 MPa or 20 MPa surface pressures, then induction heating was used to heat the vicinities of the joining surfaces to 1150° C. or 1200° C. to produce liquid phase diffusion bonded pipe joints 1.

Table 3 shows characteristics of the metal pipes 3 and the metal structures 11 and the production conditions of the liquid phase diffusion bonded pipe joints 1.

Among the produced liquid phase diffusion bonded pipe joints, the pipe ends of the metal pipes 3 of the test pieces E1 and E2 were threaded, fittings for tensile tests were attached, and the pieces were used for tensile tests. As a result, all test pieces fractured from the threaded parts.

For comparison, metal pipes 3 were press-fit over tapered slanted parts 6 without expansion and insert materials 9 were used to produce liquid phase diffusion bonded pipe joints 1. The results are shown as the test pieces F1 and F2 of Table 3.

The test piece F1 is an example which has the tapered slanted part 6, but where even if the metal pipe 3 is press-fit, the metal pipe 3 is not expanded in diameter, while the test piece F2 is an example where the end face 8 of the metal pipe 3 is made to directly abut against the wall surface corresponding to the joining surface part 5 through the insert material 9.

After this, the pieces were fixed in positions in the pipe axial directions, given 15 or 20 MPa surface pressures, then induction heating was used to heat the vicinities of the joining surfaces to 1150° C. or 1200° C. to produce liquid phase diffusion bonded pipe joints 1.

The test pieces F1 and F2 were threaded for tensile tests and used for tensile tests, whereupon all test pieces fractured from the joining surfaces.

TABLE 3

| | | Metal pipe | | | Metal joint | | | | | Joining conditions | | | | | |
|---|---|---|---|---|---|---|---|---|---|---|---|---|---|---|---|
| | | Outside | Wall | | Tapered slanted part | | | | | Expan- | | Joining | | Heat- | |
| | | di-ameter (mm) | thick-ness (mm) | Material | Taper | Length (mm) | Max. dia. (mm) | Min. dia. (mm) | Material | sion ratio % | Insert material | surface pressure MPa | Join temp. ° C. | ing time min | Tensile test Fracture location |
| Inv. ex. | E1 | 50 | 10 | SCM4 | 1/4 | 22.4 | 30.60 | 25 | SCM4 | 2 | Ni-based 1 | 15 | 1200 | 1 | Threaded part |
| | E2 | | | | | | | | | 5 | | 20 | 1150 | 1 | Threaded part |
| Comp. ex. | F1 | 50 | 10 | SCM4 | 0 | 26.0 | 31.50 | 25 | SCM4 | 0 | Ni-based 1 | 15 | 1200 | 1 | Joining surface fracture |
| | F2 | | | | No tapered slanted part | 26.0 | 29.00 | 29 | | | | 20 | 1150 | 3 | Joining surface fracture |

Example 4

Ends of two of the same metal pipes 3 were press-fit over the two sides of metal joint pipes 2 to expand them and produce liquid phase diffusion bonded pipe joints 1.

Table 4 and Table 6 show the characteristics of the metal pipes 3 and metal joints 2 and the production conditions of the liquid phase diffusion bonded pipe joints 1. The test pieces G1 to G29 of Table 4 and the test pieces I1 to I12 of Table 6 are examples according to the present invention and correspond to the joint A shown in FIG. 21A.

The metal pipes 3 were steel pipes of outside diameters of 76.3 to 318.5 mm and material grades of STKM13A, S45C, SCM4, SM490, or SUS304. The tapered shapes of the tapered slanted parts 6 of the metal joint pipes 2 were 1/16 to 1/4. At the outside surfaces of the metal joint pipes 2, joining surface parts 5 having widths equal to the wall thicknesses of the metal pipes 3 or more were provided.

The expansion ratios when press-fitting the metal pipes 3 over the tapered slanted parts 6 of the metal joint pipes 2 were made 2 to 10%. Here, the "expansion ratio" can be expressed by rate of increase of the inside diameter at the position of maximum expansion shown in the following formula (2). Further, the "wall thickness ratio" is the ratio of the pipe end wall thickness to the average wall thickness and signifies the increase in wall thickness of the pipe end due to expansion.

Expansion ratio (%)={(maximum inside diameter after expansion−initial inside diameter)/initial inside diameter}×100  (2)

The expansion ratio and wall thickness ratio were calculated from the pipe outside diameter and the wall thickness measured by an ultrasonic thickness meter etc. after expansion and joining. The wall thickness ratio was changed by the temperature at the time of expansion and joining and the thrust in the pipe axial direction when imparting surface pressure to the joining surfaces.

Liquid phase diffusion bonded pipe joints 1 were formed by press-fitting metal pipes 3 over the tapered slanted parts 6 of the metal joint pipes 2 and imparting thrust in the pipe axial direction to expand them while press-fitting.

At the joining surface parts 5 of the metal joint pipes 2, insert materials 9 comprised of Ni-based 1, Ni-based 2, or Fe-based amorphous metal (Si: 2.5 at %, B: 3.5 at %, balance: Fe and unavoidable impurities, below, "Fe-base", same in the table) were adhered and held.

After this, the end faces 8 of the metal pipes 3 were made to abut against the joining surface parts 5 of the metal joint pipes 2 and induction heating was used to heat the vicinities of the joining surfaces to 1050° C. to 1300° C. to produce liquid phase diffusion bonded pipe joints 1.

Among the produced liquid phase diffusion bonded pipe joints 1, the test pieces G1 to G29 were used for tensile tests, whereupon all fractured at the bodies of the metal pipes 3. Further, the test pieces I1 to I12 produced under the conditions shown in Table 6 were used for four-point bending tests, whereupon all test pieces buckled at the bodies of the metal pipes 3.

Figures 21A, 21B, 21C, 22:
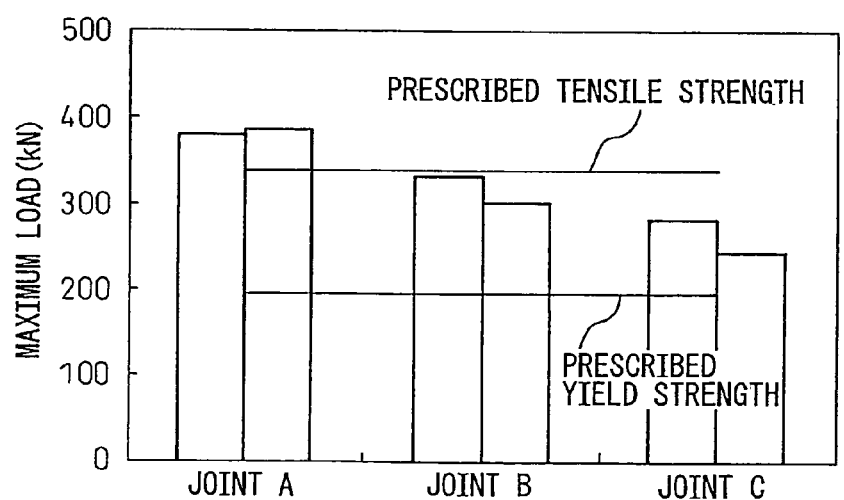
FIG. 21A is a view showing a joined state of a liquid phase diffusion bonded pipe joint used for tests.
FIG. 21B is a view showing a joined state of a liquid phase diffusion bonded pipe joint used for tests.
FIG. 21C is a view showing a joined state of a liquid phase diffusion bonded pipe joint used for tests.
FIG. 22 is a view comparing a maximum load at the time of a tensile test of a liquid phase diffusion bonded pipe joint among joints.

As comparative examples, liquid phase diffusion bonded pipe joints 1 corresponding to the joint B shown in FIG. 21B and the joint C shown in FIG. 21C were produced. The test pieces H4 to H9 in Table 5 and the test pieces J4 to J6 in Table 6 were joints B, while the test pieces H10 to H12 in Table 5 were joints C.

The end faces 8 of the metal pipes 3 were made to abut against the joining surface parts 5 of the metal joint pipes 2 or the end faces 8 of the metal pipes 3 without expanding the metal pipes 3. After this, they were fixed in positions in the pipe axial directions, then induction heating was used to heat the vicinities of the joining surfaces to 1200° C. or 1250° C. to produce liquid phase diffusion bonded pipe joints 1.

Further, the test pieces H1 to H3 of Table 5 and the test pieces J1 to J3 of Table 6 are other comparative examples which are shaped as the shape of the joint A, but where the ends of the metal pipes 3 were worked to give them flared shapes substantially the same shaped as the tapered slanted parts of the metal joint pipes 2 and the members were then joined to produce liquid phase diffusion bonded pipe joints 1. These liquid phase diffusion bonded pipe joints 1 had inside diameters of the ends of the metal pipes 3 made slightly larger than the outside diameters of the tapered slanted parts 6 of the metal joint pipes 2. The metal pipes 3 were press-fit over the front tapered parts 6 of the metal joint pipes 2 without expansion and joined to them using insert materials 9.

Among the liquid phase diffusion bonded pipe joints 1 produced as comparative examples, the test pieces H1 to H12 were used for tensile tests, while the test pieces J1 to J6 were used for four-point bending tests. In the tensile tests and the four-point bending tests, all test pieces fractured from the joining surfaces.

From the above test results, in the test pieces G1 to G29 and I1 to I12 according to the examples of the present invention, since the ends of the metal pipes 3 were press-fit over the tapered slanted parts 6 to expand them and the wall thicknesses of the ends of the metal pipes 3 were increased over the average wall thicknesses of the pipe bodies, it was verified that even at the time of application of a tensile load or bending load, the joining strengths of the liquid phase diffusion bonded parts can be made the strengths of the bodies of the metal pipes 3 or more.

As opposed to this, the test pieces H1 to H12 and J1 to J6 of the comparative examples did not have the ends of the metal pipes 3 expanded and the wall thicknesses of ends of the metal pipes 3 were not increased much at all either, so compared with the examples of the present invention, the strengths of the liquid phase diffusion bonded parts deteriorated sharply.

TABLE 4

| | | Metal pipe | | | | | Metal joint pipe | | | | Joining conditions | | | |
|---|---|---|---|---|---|---|---|---|---|---|---|---|---|---|
| | | Outside diameter (mm) | Wall thickness (mm) | Material | Expansion ratio (%) | Wall thickness ratio | Front taper | Length (mm) | Max. dia. (mm) | Min. dia. (mm) | Material | Insert material | Heating temp. (° C.) | Heating time (min) | Max. axial stress (MPa) | Tensile test Fracture location |
| Inv. ex. | G1 | 76.3 | 4 | STKM13A | 10 | 1.1 | ¼ | 67.3 | 75.13 | 58.3 | SS400 | Ni-based 1 | 1050 | 3 | 10 | Pipe body |
| | G2 | | | | | 1.15 | | | | | | | 1050 | 3 | 15 | Pipe body |
| | G3 | | | | | 1.05 | | | | | | | 1050 | 3 | 5 | Pipe body |
| | G4 | | | | 5 | 1.12 | ⅛ | 107.3 | 71.72 | 58.3 | SS400 | Ni-based 1 | 1200 | 1 | 12 | Pipe body |
| | G5 | | | | | 1.2 | | | | | | | 1200 | 1 | 20 | Pipe body |
| | G6 | | | | | 1.05 | | | | | | | 1150 | 1 | 5 | Pipe body |
| | G7 | | | | 2.5 | 1.05 | 1/16 | 187.3 | 70.01 | 58.3 | SS400 | Ni-based 2 | 1200 | 5 | 5 | Pipe body |
| | G8 | | | | | 1.08 | | | | | | | 1200 | 5 | 8 | Pipe body |
| | G9 | | | | | 1.1 | | | | | | | 1200 | 5 | 10 | Pipe body |
| | G10 | | | | 5 | 1.17 | ⅛ | 107.3 | 71.72 | 58.3 | SS400 | Ni-based 1 | 1300 | 1 | 17 | Pipe body |
| | G11 | | | | | 1.05 | | | | | | | 1300 | 1 | 5 | Pipe body |
| | G12 | | | | 5 | 1.2 | ⅛ | 107.3 | 71.72 | 58.3 | SS400 | Fe based | 1200 | 3 | 20 | Pipe body |
| | G13 | | | | | 1.1 | | | | | | | 1200 | 3 | 10 | Pipe body |
| | G14 | | | | | 1.1 | | | | | | | 1200 | 3 | 10 | Pipe body |
| | G15 | 89 | 9 | S45C | 2 | 1.15 | ⅛ | 91.4 | 72.42 | 61 | S45C | Ni-based 1 | 1220 | 5 | 15 | Pipe body |
| | G16 | | | | | 1.05 | | | | | SCM4 | | 1220 | 5 | 5 | Pipe body |
| | G17 | | | | | 1.1 | | | | | S45C | | 1220 | 5 | 10 | Pipe body |
| | G18 | | | | | 1.15 | | | | | SCM4 | | 1220 | 5 | 15 | Pipe body |
| | G19 | | | | | 1.2 | | | | | S45C | | 1220 | 5 | 20 | Pipe body |
| | G20 | | | | | 1.2 | | | | | SCM4 | | 1220 | 5 | 20 | Pipe body |
| | G21 | 177.8 | 10.4 | SCM4 | 10 | 1.03 | 1/10 | 257.0 | 172.70 | 147 | SCM4 | Ni-based 1 | 1250 | 10 | 3 | Pipe body |
| | G22 | | | | | 1.1 | | | | | | | 1250 | 10 | 10 | Pipe body |

TABLE 4-continued

|  | Metal pipe | | | | | | Metal joint pipe | | | | Joining conditions | | | |
|---|---|---|---|---|---|---|---|---|---|---|---|---|---|---|
|  | Outside diameter (mm) | Wall thickness (mm) | Material | Expansion ratio (%) | Wall thickness ratio | Front taper | Length (mm) | Max. dia. (mm) | Min. dia. (mm) | Material | Insert material | Heating temp. (° C.) | Heating time (min) | Max. axial stress (MPa) | Tensile test Fracture location |
| G23 |  |  |  |  | 1.15 |  |  |  |  |  |  | 1250 | 3 | 15 | Pipe body |
| G24 | 318.5 | 22 | SM490 | 2.5 | 1.05 | ¼ | 87.5 | 281.36 | 259.5 | SCM4 | Ni-based 1 | 1250 | 60 | 5 | Pipe body |
| G25 |  |  |  |  | 1.1 |  |  |  |  |  |  | 1250 | 30 | 10 | Pipe body |
| G26 |  |  |  |  | 1.2 |  |  |  |  |  |  | 1250 | 10 | 20 | Pipe body |
| G27 | 76.3 | 4 | SUS304 | 5 | 1.2 | ⅛ | 67.3 | 71.72 | 63.3 | SUS304 | Ni-based 1 | 1250 | 20 | 20 | Pipe body |
| G28 |  |  |  |  | 1.1 |  |  |  |  |  |  | 1250 | 10 | 10 | Pipe body |
| G29 |  |  |  |  | 1.1 |  |  |  |  |  |  | 1250 | 1 | 10 | Pipe body |

TABLE 5

|  |  | Metal pipe | | | | | | Metal joint pipe | | | | Joining conditions | | | |
|---|---|---|---|---|---|---|---|---|---|---|---|---|---|---|---|
|  |  | Outside diameter (mm) | Wall thickness (mm) | Material | Expansion ratio (%) | Wall thickness ratio | Front taper | Length (mm) | Max. dia. (mm) | Min. dia. (mm) | Material | Insert material | Heating temp. (° C.) | Heating time (min) | Max. axial stress (MPa) | Tensile test Fracture location |
| Comp. ex. | H1 | 76.3 | 4 | STKM13A | None | 1 | ⅛ | 77.6 | 68.00 | 58.3 | SS400 | Ni-based 1 | 1250 | 3 | 10 | Pipe body |
|  | H2 |  |  |  |  | 1.07 |  |  |  |  |  |  | 1250 | 3 | 15 | Pipe body |
|  | H3 |  |  |  |  | 1.02 |  |  |  |  |  |  | 1250 | 3 | 5 | Pipe body |
|  | H4 |  |  |  | None | 1.03 | 0 | 77.6 | 68.00 | 68 | SS400 | Ni-based 1 | 1200 | 1 | 12 | Pipe body |
|  | H5 |  |  |  |  | 1.05 |  |  |  |  |  |  | 1200 | 1 | 20 | Pipe body |
|  | H6 |  |  |  |  | 1.07 |  |  |  |  |  |  | 1200 | 1 | 5 | Pipe body |
|  | H7 | 89 | 9 | S45C | None | 1.02 | 0 | 50.0 | 70.00 | 70 | S45C | Ni-based 1 | 1250 | 5 | 5 | Pipe body |
|  | H8 |  |  |  |  | 1 |  |  |  |  |  |  | 1250 | 5 | 8 | Pipe body |
|  | H9 |  |  |  |  | 1.05 |  |  |  |  |  |  | 1250 | 5 | 10 | Pipe body |
|  | H10 | 76.3 | 4 | STKM13A | None | 1.01 | Metal pipes together | | | | | Ni-based 1 | 1200 | 1 | 17 | Pipe body |
|  | H11 |  |  |  |  | 1.05 |  |  |  |  |  |  | 1200 | 1 | 5 | Pipe body |
|  | H12 | 89 | 9 | S45C |  | 1 |  |  |  |  |  |  | 1200 | 3 | 20 | Pipe body |

TABLE 6

|  |  | Metal pipe | | | | | | Metal joint pipe | | | | Joining conditions | | | |
|---|---|---|---|---|---|---|---|---|---|---|---|---|---|---|---|
|  |  | Outside diameter (mm) | Wall thickness (mm) | Material | Expansion ratio (%) | Wall thickness ratio | Front taper | Length (mm) | Max. dia. (mm) | Min. dia. (mm) | Material | Insert material | Heating temp. (° C.) | Heating time (min) | Max. axial stress (MPa) | Bending test Fracture location |
| Inv. ex. | I1 | 76.3 | 4 | STKM13A | 10 | 1.1 | ¼ | 67.3 | 75.13 | 58.3 | SS400 | Ni-based 1 | 1200 | 3 | 10 | Pipe body buckling |
|  | I2 |  |  |  |  | 1.15 |  |  |  |  |  |  | 1200 | 3 | 15 | Pipe body buckling |
|  | I3 |  |  |  | 5 | 1.05 | ⅛ | 107.3 | 71.72 | 58.3 | SS400 | Ni-based 2 | 1250 | 3 | 5 | Pipe body buckling |
|  | I4 |  |  |  |  | 1.12 |  |  |  |  |  |  | 1250 | 3 | 12 | Pipe body buckling |
|  | I5 |  |  |  | 2.5 | 1.2 | 1/16 | 187.3 | 70.01 | 58.3 | SS400 | Ni-based 1 | 1200 | 5 | 20 | Pipe body buckling |
|  | I6 |  |  |  |  | 1.05 |  |  |  |  |  |  | 1200 | 5 | 5 | Pipe body buckling |
|  | I7 |  |  |  | 5 | 1.15 | ⅛ | 107.3 | 71.72 | 58.3 | SS400 | Ni-based 1 | 1300 | 1 | 15 | Pipe body buckling |

TABLE 6-continued

| | | Metal pipe | | | | | Metal joint pipe | | | | | Joining conditions | | | |
|---|---|---|---|---|---|---|---|---|---|---|---|---|---|---|---|
| | | Outside diameter (mm) | Wall thickness (mm) | Material | Expansion ratio (%) | Wall thickness ratio | Front taper | Length (mm) | Max. dia. (mm) | Min. dia. (mm) | Material | Insert material | Heating temp. (° C.) | Heating time (min) | Max. axial stress (MPa) | Bending test Fracture location |
| | I8 | | | | | 1.2 | | | | | | | 1300 | 1 | 20 | Pipe body buckling |
| | I9 | | | | 5 | 1.1 | 1/8 | 107.3 | 71.72 | 58.3 | SS400 | Fe based | 1250 | 3 | 10 | Pipe body buckling |
| | I10 | | | | | 1.08 | | | | | | | 1250 | 3 | 8 | Pipe body buckling |
| | I11 | 318.5 | 22 | SM490 | 2.5 | 1.18 | 1/4 | 67.5 | 281.36 | 264.5 | SCM4 | Ni-based 1 | 1250 | 60 | 18 | Pipe body buckling |
| | I12 | | | | | 1.1 | | | | | | | 1250 | 30 | 10 | Pipe body buckling |
| Comp. ex. | J1 | 76.3 | 4 | STKM13A | None | 1 | 1/8 | 77.6 | 68.00 | 58.3 | SS400 | Ni-based 1 | 1250 | 3 | 5 | Joining surfaces |
| | J2 | | | | | 1.07 | | | | | | | 1250 | 3 | 20 | Joining surfaces |
| | J3 | | | | | 1.02 | | | | | | | 1250 | 3 | 10 | Joining surfaces |
| | J4 | | | | None | 1.03 | 0 | 77.6 | 68.00 | 68 | SS400 | Ni-based 1 | 1250 | 10 | 10 | Joining surfaces |
| | J5 | | | | | 1.05 | | | | | | | 1250 | 10 | 20 | Joining surfaces |
| | J6 | | | | | 1.07 | | | | | | | 1250 | 10 | 15 | Joining surfaces |

Example 5

Thin-walled metal pipes 3a and thick-walled metal pipes 3b differing in wall thicknesses or outside diameters were directly joined without going through metal joint pipes to produce the liquid phase diffusion bonded pipe joints 1 shown in FIG. 3. Table 7 shows the characteristics of the thin-walled metal pipes 3a and thick-walled metal pipes 3b and the production conditions of liquid phase diffusion bonded pipe joints 1.

To maintain the surface pressure at the time of heating, a thrust in the pipe axial direction was applied to make the end faces 8b of the thin-walled metal pipes 3b abut against the joining surface parts 5 of the thick-walled metal pipes 3b, then constrain deformation in the axial direction and utilize the heat expansion due to heating.

As shown in Table 7, the test pieces K1 to K10 according to the examples of the present invention are examples where the ends of the thick-walled metal pipes 3b were provided with tapered slanted parts 6 and joining surface parts 5 and the thin-walled metal pipes 3a were press-fit over the tapered slanted parts 6 to produce liquid phase diffusion bonded pipe joints 1. Due to the tapered slanted parts 6 of the thick-walled metal pipes 3b, the ends of the thin-walled metal pipes 3a were expanded and the wall thicknesses of the ends of the thin-walled metal pipes 3a were increased from the average wall thicknesses of the pipe bodies.

The end faces 8a of the thin-walled metal pipes 3a were made to abut against the joining surface parts 5 of the thick-walled metal pipes 3b and induction heating was used to heat the vicinities of the joining surfaces to 1200 to 1250° C. The obtained liquid phase diffusion bonded pipe joints 1 were used for tensile tests, whereupon all test pieces K1 to K10 fractured from the bodies of the thin-walled metal pipes 3a.

As comparative examples, end faces 8a of thin-walled metal pipes 3a and end faces 8b of thick-walled metal pipes 3b with outside surfaces not formed with tapered slanted parts were joined, insert materials 9 were used, and induction heating was used to heat the vicinities of the joining surfaces to 1200° C. or 1250° C. to produce liquid phase diffusion bonded pipe joints 1 without ends of the thin-walled metal pipes 3a expanded by the slanting surfaces 7. The produced liquid phase diffusion bonded pipe joints 1 are shown in Table 7 as the test pieces L1 to L6. The test pieces L1 to L6 of the liquid phase diffusion bonded pipe joints 1 were used for tensile tests. As a result, they fractured from the joining surfaces of the thin-walled metal pipes 3a and thick-walled metal pipes 3b.

From the above test results, in the test pieces K1 to K10 according to the examples of the present invention, since the ends of the thin-walled metal pipes 3a were press-fit over the tapered slanted parts 6 of the thick-walled metal pipes 3b to expand them and the wall thicknesses of the ends of the thin-walled metal pipes 3a were increased over the average wall thicknesses of the pipe bodies, it was verified that at the time of application of a tensile load, the joining strengths of the liquid phase diffusion bonded parts can be made the strengths of the bodies of the metal pipes 3 or more.

The test pieces L1 to L6 according to the comparative examples did not have the ends of the thin-walled metal pipes 3a expanded and the wall thicknesses of ends of the thin-walled metal pipes 3a were not increased much at all either, so compared with the invention examples, the strengths of the liquid phase diffusion bonded parts can be said to be very low.

TABLE 7

| | | Metal pipe 1 (thin-walled pipe) | | | | | Metal pipe 2 (thick-walled pipe) | | | Slanted part length (mm) |
|---|---|---|---|---|---|---|---|---|---|---|
| | | Outside diameter (mm) | Wall thickness (mm) | Material | Expansion ratio (%) | Wall thickness ratio | Outside diameter (mm) | Wall thickness (mm) | Front taper | |
| Inv. ex. | K1 | 76.3 | 4 | STKM13A | 5 | 1.1 | 76.3 | 10 | 1/8 | 67.3 |
| | K2 | | | | 2 | 1.1 | | 8 | 1/6 | 38.2 |
| | K3 | | | | 2 | 1.05 | 89 | 25 | 1/8 | 50.9 |
| | K4 | | | | 5 | 1.05 | | 15 | 1/10 | 84.2 |
| | K5 | | 8 | | 10 | 1.1 | | 25 | 1/4 | 44.1 |
| | K6 | | 4 | S45C | 5 | 1.05 | | 15 | 1/8 | 67.3 |
| | K7 | 177.8 | 10.4 | SCM4 | 2 | 1.1 | 177.8 | 22 | 1/8 | 65.1 |
| | K8 | | | | 2 | 1.1 | | 30 | 1/8 | 65.1 |
| | K9 | | 7 | | 2 | 1.05 | 193.4 | 22 | 1/8 | 66.2 |
| | K10 | | | | 5 | 1.05 | | 30 | 1/10 | 131.9 |
| Comp. ex. | L1 | 76.3 | 4 | STKM13A | None | 1.1 | 76.3 | 10 | 1/8 | 37.6 |
| | L2 | | | | None | 1.1 | | 10 | 1/8 | 37.6 |
| | L3 | | | | None | 1.05 | 89 | 25 | 1/8 | 29.6 |
| | L4 | 177.8 | 10.4 | SCM4 | None | 1.1 | 177.8 | 22 | 1/8 | 32.0 |
| | L5 | | | | None | 1.1 | | 30 | 1/8 | 32.0 |
| | L6 | | 7 | | None | 1.05 | 193.4 | 22 | 1/8 | 64.0 |

| | | Metal pipe 2 (thick-walled pipe) | | | Joining conditions | | | | Tensile test Fracture location |
|---|---|---|---|---|---|---|---|---|---|
| | | Slanted part max. dia. (mm) | Slanted part min. dia. (mm) | Material | Insert material | Heating temp. (° C.) | Heating time (min) | Max. axial stress (MPa) | |
| Inv. ex. | K1 | 71.72 | 63.3 | STKM13A | Ni-based 1 | 1250 | 3 | 10 | Pipe body |
| | K2 | 69.67 | 63.3 | | | 1200 | 5 | 10 | Pipe body |
| | K3 | 69.67 | 63.3 | | | 1250 | 3 | 5 | Pipe body |
| | K4 | 71.72 | 63.3 | | | 1200 | 5 | 5 | Pipe body |
| | K5 | 66.33 | 55.3 | | | 1250 | 5 | 10 | Pipe body |
| | K6 | 71.72 | 63.3 | SCM4 | Ni-based 2 | 1200 | 5 | 5 | Pipe body |
| | K7 | 160.14 | 152 | SCM4 | Ni-based 1 | 1250 | 3 | 10 | Pipe body |
| | K8 | 160.14 | 152 | | | 1250 | 3 | 10 | Pipe body |
| | K9 | 167.08 | 158.8 | | | 1250 | 3 | 5 | Pipe body |
| | K10 | 171.99 | 158.8 | | | 1250 | 3 | 5 | Pipe body |
| Comp. ex. | L1 | 68.00 | 63.3 | STKM13A | Ni-based 1 | 1250 | 3 | 10 | Joining surface |
| | L2 | 68.00 | 63.3 | | | 1250 | 3 | 10 | Joining surface |
| | L3 | 67.00 | 63.3 | | | 1250 | 3 | 5 | Joining surface |
| | L4 | 156.00 | 152 | SCM4 | Ni-based 1 | 1250 | 3 | 10 | Joining surface |
| | L5 | 156.00 | 152 | | | 1250 | 3 | 10 | Joining surface |
| | L6 | 163.00 | 155 | | | 1250 | 3 | 5 | Joining surface |

Example 6

The ends of two of the same metal pipes 3 were press-fit over the two sides of metal joint pipes 2 changed in angles θ formed by the joining surface parts 5 and tapered slanted parts 6 for expansion to produce liquid phase diffusion bonded pipe joints 1 shown in FIG. 4. Table 8 shows the characteristics of the metal pipes and metal joint pipes and the production conditions of the liquid phase diffusion bonded pipe joints.

The test pieces M1 to M9 in Table 8 are examples of the present invention and examples of joining metal pipes 3 with outside diameters of 76.3 mm or 177.8 mm, wall thicknesses of 4 mm or 10.3 mm, and material grades of SCM4 or STKM13A using metal joint pipes 2.

To maintain the surface pressure at the time of heating, a thrust in the pipe axial direction was applied to make the end faces 8 of the metal pipes 3 abut against the joining surface parts 5 of the metal joint pipes 2, then constrain deformation in the axial direction and utilize the heat expansion due to heating.

Metal joint pipes 2 were provided with various tapered slanted parts 6 by machining and insert materials 9 were adhered to the joining surface parts 5. Here, the angles θ formed by the joining surface parts 5 and tapered slanted parts 6 were made 70 to 110°.

The metal pipes 3 were press-fit over the tapered slanted parts 6 with expansion ratios of 5%, the end faces 8 of the metal pipes 3 were made to abut against the joining surface parts 5 to fix the positions in the pipe axial directions, then induction heating was used to heat the vicinities of the joining surfaces to 1050 to 1250° C. The wall thickness ratios were changed by the temperatures at the time of expansion and joining and the thrust in the pipe axial direction when imparting surface pressures to the joining surfaces 5.

The test pieces of all of the liquid phase diffusion bonded pipe joints 1 obtained were measured for wall thickness ratios and used for tensile tests. As a result of the tensile tests, all of the test pieces M1 to M9 fractured at the bodies of the metal pipes 3.

As comparative examples, metal joint pipes 2 with angles θ formed by the joining surface parts 5 and the tapered slanted parts 6 of 60°, 65°, and 115° were used, metal pipes 3 were press-fit over the tapered slanted parts 6 for expansion, insert materials 9 were used, and induction heating was used to heat the vicinities of the joining surfaces to 1050 to 1250° C. to produce liquid phase diffusion bonded pipe joints 1. These are shown in Table 8 as the test pieces N1 to N7.

In the example using a metal joint pipe 2 with an θ of 115°, at the stage of applying the thrust in the pipe axial direction at the time of production of the liquid phase diffusion bonded pipe joint 1, the ends of the metal pipes 3 deformed into flared shapes as shown in FIG. 9 and a suitable liquid phase diffusion bonded pipe joint 1 could not be formed.

In the case of a θ of 65° or less, liquid phase diffusion bonded pipe joints 1 could be formed, but remarkable deformation occurred at the joining surface parts 5. When using the test pieces for tensile tests, they fractured from the joining surfaces.

From the above test results, in the test pieces M1 to M9 according to the examples of the present invention, since the angles θ formed by the joining surface parts 5 and tapered slanted parts 6 are adjusted to a suitable range, it was verified that at the time of application of a tensile load, the joining strengths of the liquid phase diffusion bonded parts can be made the strengths of the bodies of the metal pipes 3 or more.

The test pieces N1 to N7 according to the comparative examples had angles θ formed by the joining surface parts 5 and tapered slanted parts 6 outside the suitable range, so unsuitable deformation occurred at the pipe ends of the metal pipes 3 at the time of joining or the joining surface parts of the metal joint pipes 2, therefore, compared with the invention examples, the joining strengths of the liquid phase diffusion bonded parts became lower or suitable liquid phase diffusion bonded joints 1 could not be formed.

TABLE 8

| | | Metal pipe | | | | | |
|---|---|---|---|---|---|---|---|
| | | Outside diameter (mm) | Wall thickness (mm) | Material | Expansion ratio (%) | Wall thickness ratio | θ (°) |
| Inv. ex. | M1 | 76.3 | 4 | STKM13A | 5 | 1.1 | 110 |
| | M2 | | | | | 1.15 | 90 |
| | M3 | | | | | 1.1 | 75 |
| | M4 | | | | | 1.2 | 75 |
| | M5 | | | | | 1.05 | 75 |
| | M6 | | | | | 1.1 | 70 |
| | M7 | 177.8 | 10.4 | SCM4 | 5 | 1.03 | 110 |
| | M8 | | | | | 1.1 | 90 |
| | M9 | | | | | 1.15 | 70 |
| Comp. ex. | N1 | 76.3 | 1 | STKM13A | 5 | 1.1 | 115 |
| | N2 | | | | | 1.15 | 65 |
| | N3 | | | | | 1.1 | 60 |
| | N4 | | | | | 1.2 | 65 |
| | N5 | 177.8 | 10.4 | SCM4 | 5 | 1.03 | 115 |
| | N6 | | | | | 1.1 | 65 |
| | N7 | | | | | 1.15 | 65 |

| | | Metal joint pipe | | | | | Joining conditions | | | |
|---|---|---|---|---|---|---|---|---|---|---|
| | | Front taper | Length (mm) | Max. dia. (mm) | Min. dia. (mm) | Material | Insert material | Heating temp. (° C.) | Heating time (min) | Max. axial stress (MPa) | Tensile test Fracture location |
| Inv. ex. | M1 | 1/8 | 67.3 | 71.72 | 63.3 | SS400 | Ni-based 1 | 1050 | 3 | 10 | Pipe body |
| | M2 | | | | | | | 1250 | 10 | 15 | Pipe body |
| | M3 | | | | | | | 1250 | 10 | 10 | Pipe body |
| | M4 | | | | | | | 1200 | 5 | 20 | Pipe body |
| | M5 | | | | | | | 1250 | 10 | 5 | Pipe body |
| | M6 | | | | | | | 1250 | 10 | 10 | Pipe body |
| | M7 | 1/10 | 128.5 | 164.85 | 152 | SCM4 | Ni-based 1 | 1250 | 10 | 3 | Pipe body |
| | M8 | | | | | | | 1250 | 10 | 10 | Pipe body |
| | M9 | | | | | | | 1250 | 3 | 15 | Pipe body |
| Comp. ex. | N1 | 1/8 | 67.3 | 71.72 | 63.3 | SS400 | Ni-based 1 | 1050 | 3 | 10 | Flared |
| | N2 | | | | | | | 1250 | 10 | 15 | Joining surface |

TABLE 8-continued

| N3 | | | | | | | 1250 | 10 | 10 | Joining surface |
|----|---|---|---|---|---|---|------|----|----|-----------------|
| N4 | | | | | | | 1200 | 5 | 20 | Joining surface |
| N5 | 1/10 | 128.5 | 164.85 | 152 | SCM4 | Ni-based 1 | 1250 | 10 | 3 | Flared |
| N6 | | | | | | | 1250 | 10 | 10 | Joining surface |
| N7 | | | | | | | 1250 | 3 | 15 | Joining surface |

Example 7

Thin-walled metal pipes 3a and thick-walled metal pipes 3b with the same outside diameters and material grades but different wall thicknesses were joined through metal joint pipes 2a to produce the liquid phase diffusion bonded pipe joints 1 shown in FIG. 5. Table 9 shows the characteristics of the thin-walled metal pipes 3a and thick-walled metal pipes 3b and the production conditions of the liquid phase diffusion bonded pipe joints 1.

To maintain the surface pressure at the time of heating, a thrust in the pipe axial direction was applied to make the end faces 8a of the thin-walled metal pipes 3a and the end faces 8b of the thick-walled metal pipes 3b abut against the joining surface parts 5 of the metal joint pipes 2a, then constrain deformation in the axial direction and utilize the heat expansion due to heating.

The ends of the thin-walled metal pipes 3a and thick-walled metal pipes 3b were expanded by the tapered slanted parts 6 and the wall thicknesses of the ends of the thin-walled metal pipes 3a were increased. Furthermore, the test pieces O1 to O10 according to the examples of the present invention in all combinations had slant angles $S_1$, $S_2$ of the tapered slanted parts 6 of the metal joint pipes 2a, cross-sectional areas $A_1$ of the thin-walled metal pipes, and cross-sectional areas $A_2$ of the thick-walled metal pipes satisfying the above formula (1).

The test pieces O1 to O10 of the liquid phase diffusion bonded pipe joints 1 obtained in the above way were used for tensile tests, whereupon all of the test pieces fractured from the bodies of the thin-walled metal pipes.

The test pieces P1 to P7 of the comparative examples are examples not satisfying the formula (1). In the test pieces P1 to P3 and P5, due to the thrust in the pipe axial direction at the time of production of the liquid phase diffusion bonded pipe joints 1, the ends of the thin-walled metal pipes 3a or thick-walled metal pipes 3b buckled.

In the test pieces P4, P6, and P7, the ends of the thin-walled metal pipes 3a or thick-walled metal pipes 3b did not buckle, but when used for tensile tests, the test pieces fractured from the joining surfaces of the thin-walled metal pipes 3a or thick-walled metal pipes 3b.

From the above test results, it was verified that in the test pieces O1 to O10 according to the examples of the present invention, if the slant angles $S_1$, $S_2$ of the tapered slanted parts 6 of the metal joint pipes 2a, cross-sectional areas $A_1$ of the thin-walled metal pipes, and cross-sectional areas $A_2$ of the thick-walled metal pipes satisfied the above formula (1), the ends of the thin-walled metal pipes 3a and thick-walled metal pipes 3b did not buckle and a deterioration in the joining strengths of the joined parts of the thin-walled metal pipes 3a and thick-walled metal pipes 3b could be prevented.

The test pieces P1 to P7 according to the comparative examples did not satisfy the relationship of the above formula (1), so the ends of the thin-walled metal pipes 3a or thick-walled metal pipes 3b buckled or the joined parts of the thin-walled metal pipes 3a or thick-walled metal pipes 3b fractured.

TABLE 9

| | | Metal pipe 1 (thin-walled pipe) | | | | | Metal pipe 2 (thick-walled pipe) | | | |
|---|---|---|---|---|---|---|---|---|---|---|
| | | Outside diaMeter (mm) | Wall thickness (mm) | Material | Expansion ratio (%) | Wall thickness ratio | Outside diameter (mm) | Wall thickness (mm) | Material | Expansion ratio (%) |
| Inv. ex. | O1 | 76.3 | 4 | STKM13A | 5 | 1.1 | 76.3 | 6 | STKM13A | 5 |
| | O2 | | 4 | | 2 | 1.1 | | 7 | | 2 |
| | O3 | | 3.5 | | 5 | 1.1 | | 5.6 | | 5 |
| | O4 | | 6 | | 2 | 1.05 | | 10 | | 5 |
| | O5 | | 6 | | 5 | 1.05 | | 10 | | 2 |
| | O6 | | 6.5 | | 10 | 1.1 | | 10 | | 2 |
| | O7 | 177.8 | 10.4 | SCM4 | 2 | 1.1 | 177.8 | 14 | SCM4 | 2 |
| | O8 | | 10.4 | | 2 | 1.1 | | 14 | | 2 |
| | O9 | | 7 | | 2 | 1.05 | | 14 | | 2 |
| | O10 | | 12 | | 5 | 1.05 | | 14 | | 5 |
| Comp. ex. | P1 | 76.3 | 4 | STKM13A | 5 | 1.1 | 76.3 | 6 | STKM13A | 5 |
| | P2 | | 4 | | 5 | 1.1 | | 7 | | 5 |
| | P3 | | 6 | | 5 | 1.1 | | 10 | | 5 |
| | P4 | | 6 | | 5 | 1.1 | | 6 | | 5 |
| | P5 | 177.8 | 10.4 | SCM4 | 2 | 1.1 | 177.8 | 14 | SCM4 | 2 |
| | P6 | | 10.4 | | 5 | 1.1 | | 14 | | 2 |
| | P7 | | 7 | | 2 | 1.05 | | 14 | | 2 |

TABLE 9-continued

| | | Metal joint pipe | | | | | | | | |
|---|---|---|---|---|---|---|---|---|---|---|
| | | Front taper 1 | Slanted part 1 Length (mm) | Slanted part 1 max. dia. (mm) | Slanted part 1 min. dia. (mm) | Front taper 2 | Slanted part 2 Length (mm) | Slanted part 2 max. dia. (mm) | Slanted part 2 min. dia. (mm) | Material |
| Inv. ex. | O1 | 1/8 | 67.3 | 71.72 | 63.3 | 1/10 | 82.2 | 67.52 | 59.3 | SS400 |
| | O2 | 1/8 | 50.9 | 69.67 | 63.3 | 1/16 | 99.9 | 63.55 | 57.3 | |
| | O3 | 1/8 | 67.7 | 72.77 | 64.3 | 1/10 | 82.6 | 68.36 | 60.1 | |
| | O4 | 1/6 | 37.7 | 65.59 | 59.3 | 1/10 | 78.2 | 59.12 | 51.3 | |
| | O5 | 1/12 | 98.6 | 67.52 | 59.3 | 1/16 | 98.0 | 57.43 | 51.3 | |
| | O6 | 1/8 | 90.6 | 69.63 | 58.3 | 1/14 | 85.8 | 57.43 | 51.3 | |
| | O7 | 1/8 | 65.1 | 160.14 | 152 | 1/10 | 80.0 | 152.80 | 144.8 | SCM4 |
| | O8 | 1/8 | 65.1 | 160.14 | 152 | 1/12 | 96.0 | 152.80 | 144.8 | |
| | O9 | 1/8 | 66.2 | 167.08 | 158.8 | 1/14 | 111.9 | 152.80 | 144.8 | |
| | O10 | 1/10 | 126.9 | 161.49 | 148.8 | 1/10 | 124.9 | 157.29 | 144.8 | |
| Comp. ex. | P1 | 1/8 | 67.3 | 71.72 | 63.3 | 1/8 | 65.7 | 67.52 | 59.3 | SS400 |
| | P2 | 1/6 | 50.5 | 71.72 | 63.3 | 1/14 | 113.6 | 65.42 | 57.3 | |
| | P3 | 1/10 | 82.2 | 67.52 | 59.3 | 1/8 | 62.5 | 59.12 | 51.3 | |
| | P4 | 1/8 | 65.7 | 67.52 | 59.3 | 1/10 | 82.2 | 67.52 | 59.3 | |
| | P5 | 1/8 | 65.1 | 160.14 | 152 | 1/14 | 111.9 | 152.80 | 144.8 | SCM |
| | P6 | 1/8 | 102.8 | 164.85 | 152 | 1/8 | 64.0 | 152.80 | 144.8 | |
| | P7 | 1/8 | 66.2 | 167.08 | 158.8 | 1/12 | 96.0 | 152.80 | 144.8 | |

| | | Joining conditions | | | | | |
|---|---|---|---|---|---|---|---|
| | | S1 × A1 S2 × A2 | Insert material | Heating temp. (° C.) | Heating time (min) | Max. axial stress (MPa) | Tensile test Fracture location |
| Inv. ex. | O1 | 0.86 | Ni-based 1 | 1250 | 3 | 10 | Pipe body |
| | O2 | 1.19 | | 1200 | 5 | 10 | Pipe body |
| | O3 | 0.80 | | 1200 | 5 | 10 | Pipe body |
| | O4 | 1.06 | | 1250 | 3 | 5 | Pipe body |
| | O5 | 0.85 | | 1200 | 5 | 5 | Pipe body |
| | O6 | 1.20 | | 1250 | 5 | 10 | Pipe body |
| | O7 | 0.95 | Ni-based 2 | 1250 | 3 | 10 | Pipe body |
| | O8 | 1.14 | | 1250 | 3 | 10 | Pipe body |
| | O9 | 0.91 | | 1250 | 3 | 5 | Pipe body |
| | O10 | 0.87 | | 1250 | 3 | 5 | Pipe body |
| Comp. ex. | P1 | 0.69 | Ni-based 1 | 1250 | 3 | 10 | Buckling when joining |
| | P2 | 1.39 | | 1250 | 3 | 10 | Buckling when joining |
| | P3 | 0.51 | | 1250 | 3 | 10 | Buckling when joining |
| | P4 | 1.25 | Ni-based 1 | 1250 | 3 | 10 | Joined part |
| | P5 | 1.33 | | 1250 | 3 | 10 | Buckling when joining |
| | P6 | 0.76 | | 1250 | 3 | 10 | Joined part |
| | P7 | 0.78 | | 1250 | 3 | 5 | Joined part |

Example 8

Small cross-sectional area metal pipes 3a and large cross-sectional area metal pipes 3b differing in cross-sectional areas due to one or both of the wall thicknesses or outside diameters differing were joined through metal joint pipes 2a to produce the liquid phase diffusion bonded pipe joints 1 shown in FIG. 6. Table 10 shows the characteristics of the small cross-sectional area metal pipes 3a and large cross-sectional area metal pipes 3b and the production conditions of the liquid phase diffusion bonded pipe joints 1.

To maintain the surface pressure at the time of heating, a thrust in the pipe axial, direction was applied to make the end faces 8a of the small cross-sectional area metal pipes 3a and the end faces 8b of the large cross-sectional area metal pipes 3b abut against the joining surface parts 5 of the metal joint pipes 2a, then constrain deformation in the axial direction and utilize the heat expansion due to heating.

The ends of the small cross-section metal pipes 3a and large cross-section metal pipes 3b were expanded by the tapered slanted parts 6 and the wall thicknesses of the ends of the small cross-section metal pipes 3a were increased. Furthermore, Q1 to Q10 according to the examples of the present invention in all combinations had slant angles $S_1$, $S_2$ of the tapered slanted parts 6 of the metal joint pipes 2a, cross-sectional areas $A_1$ of the small cross-sectional area metal pipes, and cross-sectional areas $A_2$ of the large cross-sectional area metal pipes satisfying the above formula (1).

The test pieces Q1 to Q10 of the liquid phase diffusion bonded pipe joints 1 were used for tensile tests, whereupon all of the test pieces fractured from the bodies of the small cross-section metal pipes 3a.

The test pieces R1 to R9 according to the comparative examples are examples not satisfying the formula (1). In the test pieces R1, R5, R7, and R8, due to the thrust in the pipe axial direction at the time of production of the liquid phase diffusion bonded pipe joints 1, the ends of the small cross-section metal pipes 3a or large cross-section metal pipes 3b buckled.

In the test pieces R2 to R4, R6, and R9, the ends of the small cross-section metal pipes 3a or large cross-section metal pipes 3b did not buckle, but when used for tensile tests, the test pieces fractured from the joining surfaces of the small cross-section metal pipes 3a or large cross-section metal pipes 3b.

From the above test results, it was verified that in the test pieces Q1 to Q10 according to the examples of the present invention, if the slant angles $S_1$, $S_2$ of the tapered slanted parts 6 of the metal joint pipes 2a, cross-sectional areas $A_1$ of the small cross-sectional area metal pipes, and cross-sectional areas $A_2$ of the large cross-sectional area metal pipes satisfied the above formula (1), the ends of the small cross-sectional area metal pipes 3a and large cross-sectional area metal pipes 3b did not buckle and a deterioration in the joining strengths of the joined parts of the large cross-sectional area metal pipes 3a and large cross-sectional area metal pipes 3b could be prevented.

The test pieces R1 to R9 according to the comparative examples did not satisfy the relationship of the above formula (1), so the ends of the small cross-section metal pipes 3a or large cross-section pipes 3b buckled or the joined parts of the small cross-section metal pipes 3a or large cross-section metal pipes 3b fractured.

TABLE 10

| | | Metal pipe 1 (small cross-section metal pipe) | | | | | Metal pipe 2 (large cross-section metal pipe) | | | |
|---|---|---|---|---|---|---|---|---|---|---|
| | | Outside diameter (mm) | Wall thickness (mm) | Material | Expansion ratio (%) | Wall thickness ratio | Outside diameter (mm) | Wall thickness (mm) | Material | Expansion ratio (%) |
| Inv. ex. | Q1 | 76.3 | 4 | STKM13A | 5 | 1.1 | 89 | 4 | STKM13A | 5 |
| | Q2 | | 4 | | 2 | 1.1 | 89 | 7 | | 2 |
| | Q3 | 89 | 3.6 | | 2 | 1.05 | 76.3 | 10 | | 5 |
| | Q4 | | 4 | | 2 | 1.05 | 76.3 | 10 | | 5 |
| | Q5 | | 4 | | 5 | 1.05 | 76.3 | 8 | | 2 |
| | Q6 | 76.3 | 8 | | 10 | 1.1 | 89 | 11.8 | | 2 |
| | Q7 | 177.8 | 10.4 | SCM4 | 2 | 1.1 | 193.4 | 10.4 | SCM4 | 2 |
| | Q8 | | 10.4 | | 2 | 1.1 | 193.4 | 14 | | 2 |
| | Q9 | | 7 | | 2 | 1.05 | 193.4 | 12 | | 2 |
| | Q10 | | 7 | | 5 | 1.05 | 193.4 | 9 | | 5 |
| Comp. ex. | R1 | 76.3 | 4 | STKM13A | 5 | 1.1 | 89 | 5 | STKM13A | 5 |
| | R2 | | 4 | | 2 | 1.1 | 89 | 7 | | 2 |
| | R3 | 89 | 4 | | 2 | 1.05 | 76.3 | 8 | | 5 |
| | R4 | | 4 | | 5 | 1.05 | 76.3 | 8 | | 2 |
| | R5 | 76.3 | 8 | | 10 | 1.1 | 89 | 11.8 | | 2 |
| | R6 | 177.8 | 10.4 | SCM4 | 2 | 1.1 | 193.4 | 13 | SCM4 | 2 |
| | R7 | | 10.4 | | 2 | 1.1 | 193.4 | 10.4 | | 2 |
| | R8 | | 7 | | 2 | 1.05 | 193.4 | 12 | | 2 |
| | R9 | | 7 | | 5 | 1.05 | 193.4 | 9 | | 5 |

| | | Metal joint pipe | | | | | | | |
|---|---|---|---|---|---|---|---|---|---|
| | | Front taper 1 | Slanted part length (mm) | Slanted part max. dia. (mm) | Slanted part 1 min. dia. (mm) | Front taper 2 | Slanted part 2 length (mm) | Slanted part 2 max. dia. (mm) | Slanted part 2 min. dia. (mm) | Material |
| Inv. ex. | Q1 | 1/8 | 67.3 | 71.72 | 63.3 | 1/8 | 72.4 | 85.05 | 76 | SS400 |
| | Q2 | 1/8 | 50.9 | 69.67 | 63.3 | 1/16 | 104.0 | 76.50 | 70 | |
| | Q3 | 1/8 | 53.1 | 83.44 | 76.8 | 1/14 | 109.4 | 59.12 | 51.3 | |
| | Q4 | 1/6 | 39.7 | 82.62 | 76 | 1/10 | 78.2 | 59.12 | 51.3 | |
| | Q5 | 1/10 | 90.5 | 85.05 | 76 | 1/16 | 99.3 | 61.51 | 55.3 | |
| | Q6 | 1/4 | 44.1 | 66.33 | 55.3 | 1/8 | 50.5 | 66.71 | 60.4 | |
| | Q7 | 1/8 | 65.1 | 160.14 | 152 | 1/10 | 84.5 | 176.05 | 167.6 | SCM4 |
| | Q8 | 1/8 | 65.1 | 160.14 | 152 | 1/12 | 99.7 | 168.71 | 160.4 | |
| | Q9 | 1/8 | 66.2 | 167.08 | 158.8 | 1/14 | 117.4 | 172.79 | 164.4 | |
| | Q10 | 1/10 | 131.9 | 171.99 | 158.8 | 1/12 | 165.2 | 184.17 | 170.4 | |
| Comp. ex. | R1 | 1/8 | 67.3 | 71.72 | 63.3 | 1/8 | 71.6 | 82.95 | 74 | SS400 |
| | R2 | 1/8 | 50.9 | 69.67 | 63.3 | 1/12 | 78.0 | 76.50 | 70 | |
| | R3 | 1/8 | 53.0 | 82.62 | 76 | 1/16 | 128.2 | 63.32 | 55.3 | |
| | R4 | 1/10 | 90.5 | 85.05 | 76 | 1/12 | 74.5 | 61.51 | 55.3 | |
| | R5 | 1/6 | 66.2 | 66.33 | 55.3 | 1/6 | 37.8 | 66.71 | 60.4 | |
| | R6 | 1/8 | 65.1 | 160.14 | 152 | 1/8 | 66.8 | 170.75 | 162.4 | SCM4 |
| | R7 | 1/8 | 65.1 | 160.14 | 152 | 1/12 | 101.4 | 176.05 | 167.6 | |
| | R8 | 1/8 | 66.2 | 167.08 | 158.8 | 1/10 | 83.9 | 172.79 | 164.4 | |
| | R9 | 1/10 | 131.9 | 171.99 | 158.8 | 1/10 | 137.7 | 184.17 | 170.4 | |

| | | Joining conditions | | | | |
|---|---|---|---|---|---|---|
| | | S1 × A1 / S2 × A2 | Insert material | Heating temp. (° C.) | Heating time (min) | Max. axial stress (MPa) | Tensile test Fracture location |
| Inv. ex. | Q1 | 0.85 | Ni-based 1 | 1250 | 3 | 10 | Pipe body |
| | Q2 | 1.01 | | 1200 | 5 | 10 | Pipe body |
| | Q3 | 0.80 | | 1200 | 5 | 10 | Pipe body |
| | Q4 | 0.85 | | 1250 | 3 | 5 | Pipe body |
| | Q5 | 1.00 | | 1200 | 5 | 5 | Pipe body |
| | Q6 | 1.20 | | 1250 | 5 | 10 | Pipe body |

TABLE 10-continued

|  |  |  |  |  |  |  |  |
|---|---|---|---|---|---|---|---|
|  | Q7 | 1.14 | Ni-based 1 | 1250 | 3 | 10 | Pipe body |
|  | Q8 | 1.04 |  | 1250 | 3 | 10 | Pipe body |
|  | Q9 | 0.96 |  | 1250 | 3 | 5 | Pipe body |
|  | Q10 | 0.86 |  | 1250 | 3 | 5 | Pipe body |
| Comp. ex. | R1 | 0.69 | Ni-based 1 | 1250 | 3 | 10 | Buckling when joining |
|  | R2 | 0.76 |  | 1200 | 5 | 10 | Joined part |
|  | R3 | 1.24 |  | 1250 | 3 | 5 | Joined part |
|  | R4 | 0.75 |  | 1200 | 5 | 5 | Joined part |
|  | R5 | 0.60 |  | 1250 | 5 | 10 | Buckling when joining |
|  | R6 | 0.74 | Ni-based 1 | 1250 | 3 | 10 | Joined part |
|  | R7 | 1.37 |  | 1250 | 3 | 10 | Buckling when joining |
|  | R8 | 0.69 |  | 1250 | 3 | 5 | Buckling when joining |
|  | R9 | 0.72 |  | 1250 | 3 | 5 | Joined part |

INDUSTRIAL APPLICABILITY

According to the present invention, by controlling the surface pressure at the time of heating, it is possible to avoid fracture at the joining surfaces. Also, without causing a large rise in the joining costs, it is possible to provide a liquid phase diffusion bonded pipe joint joining a metal material and a metal member, joint pipe, or thick-walled metal pipe tapered at the outside surface at one end or both ends by liquid phase diffusion bonding and thereby excellent in joining strength. Furthermore, according to the present invention, it is possible to provide a liquid phase diffusion bonded pipe joint connecting metal pipes of different wall thicknesses, a liquid phase diffusion bonded pipe joint connecting metal pipes of different outside diameters, etc.

Accordingly, the present invention has great industrial applicability.

REFERENCE SIGNS LIST

1 liquid phase diffusion bonded pipe joint
2 metal joint
2a metal joint pipe
3, 3a, 3b metal pipe
4 axis of rotational symmetry
5, 5a, 5b joining surface part
6, 6a, 6b tapered slanted part
7, 7a, 7b slanting surface
8, 8a, 8b end face
9 insert material
21 wall (metal structure)
22 wall surface
23 pipeline inside metal structure
24 pipeline connecting pipeline inside metal structure and metal pipe
41 induction heater

The invention claimed is:

1. A liquid phase diffusion bonded pipe coupling, comprising:
a steel coupling, comprising a tapered slanted part and a joining surface part, wherein
the steel coupling is joined to a steel pipe, and the steel pipe having an axis;
the tapered slanted part is press-fit into an end of the steel pipe along the axis of the pipe, such that the steel pipe inside diameter is enlarged, and the end of the steel pipe and the joining surface part of the tapered slanted part are tightly engaged;
an end face of the end of the steel pipe and the joining surface part of the tapered slanted part are bonded by liquid phase diffusion bonding; and wherein
the thickness of the enlarged end of the steel pipe, tightly engaged with the tapered slanted part, is greater than the thickness of the body of the steel pipe; and wherein
the steel pipe inside diameter is larger than a minimum outside diameter and smaller than a maximum outside diameter of the tapered slanted part.

2. The liquid phase diffusion bonded pipe coupling as set forth in claim 1, wherein the steel coupling is formed at a metal structure.

3. The liquid phase diffusion bonded pipe coupling as set forth in claim 2, wherein the metal structure further comprises a pipeline in the metal structure, and the steel coupling comprises a pipeline connecting the pipeline in the metal structure and the steel pipe.

4. The liquid phase diffusion bonded pipe coupling as set forth in claim 1, wherein the metal coupling is formed at an end of another steel pipe to be joined with the steel pipe.

5. The liquid phase diffusion bonded pipe coupling as set forth in claim 1, wherein the steel coupling is a steel coupling pipe comprising the joining surface part at the center of the steel coupling pipe, the steel coupling pipe comprising tapered slanted parts extending from two sides of the joining surface part.

6. The liquid phase diffusion bonded pipe coupling as set forth in claim 5, wherein
one tapered slanted part of the steel coupling pipe has a slant angle $S_1$,
the other tapered slanted part has a slant angle $S_2$,
a steel pipe with an end tightly engaged with the tapered slanted part of the slant angle $S_1$ and with an end face joined to one surface of the center joining surface part by liquid phase diffusion bonding has a cross-sectional area $A_1$, and
a steel pipe with an end tightly engaged with the tapered slanted part of the slant angle $S_2$ and with an end face joined to the other surface of the center joining su6rface part by liquid phase diffusion bonding has a cross-sectional area $A_2$, wherein
$S_1$, $S_2$, $A_1$, and $A_2$ satisfy the equation:

$$0.8 \leq (S_1 \times A_1)/(S_2 \times A_2) \leq 1.2.$$

7. The liquid phase diffusion bonded pipe coupling as set forth in claim 6, wherein the steel pipe having the cross-sectional area $A_1$ has a thickness different from a thickness of the steel pipe having the cross-sectional area $A_2$.

8. The liquid phase diffusion bonded pipe coupling as set forth in claim 6, wherein the steel pipe having the cross-sectional area $A_1$ has a thickness thinner than a thickness of the steel pipe having the cross-sectional area $A_2$ and the slant angle $S_1$ of the steel coupling pipe is larger than the slant angle $S_2$ of the steel coupling pipe.

9. The liquid phase diffusion bonded pipe coupling as set forth in claim 1, wherein an angle formed by the tapered slanted part and joining surface part is 70° to 110 °.

\* \* \* \* \*

UNITED STATES PATENT AND TRADEMARK OFFICE
CERTIFICATE OF CORRECTION

| | | |
|---|---|---|
| PATENT NO. | : 8,955,887 B2 | Page 1 of 1 |
| APPLICATION NO. | : 12/737847 | |
| DATED | : February 17, 2015 | |
| INVENTOR(S) | : Eiji Tsuru et al. | |

It is certified that error appears in the above-identified patent and that said Letters Patent is hereby corrected as shown below:

In the specification

Column 3, line 1, change "tapered slanted part is $S_2$/a cross-sectional area" to -- tapered slanted part is $S_2$, a cross-sectional area --;

Column 3, line 9, change "diffusion bonding is $A_2/S_1$, $S_2$, $A_1$, and $A_2$" to -- diffusion bonding is $A_2$, $S_1$, $S_2$, $A_1$, and $A_2$ --;

Column 3, line 24, change "pipe joint, comprises" to -- pipe joint comprises --;

Column 10, line 41, change "a tapered-slanted part" to -- a tapered slanted part --;

Column 11, line 35, change "over the tapered, slanted" to -- over the tapered slanted --;

Column 13, line 28, change "For the insert material, an Ni-based" to -- For the insert materials, an Ni-based --;

Column 14, line 59, change "temperature readies 1200° C," to -- temperature reaches 1200° C, --;

Column 33, line 56, change "the pipe axial, direction" to -- the pipe axial direction --;

Column 34, Table 9, under the column called "Material", last entry, change "SCM" to -- SCM4 --; and In the claims Column 38, line 52, change "the center joining su6rface" to -- the center joining surface --.

Signed and Sealed this
Second Day of February, 2016

Michelle K. Lee
*Director of the United States Patent and Trademark Office*